US011397620B2

(12) United States Patent
Butterworth et al.

(10) Patent No.: US 11,397,620 B2
(45) Date of Patent: Jul. 26, 2022

(54) DEPLOYMENT OF EVENT-DRIVEN APPLICATION IN AN IOT ENVIRONMENT

(71) Applicant: Vantiq, Inc., Walnut Creek, CA (US)

(72) Inventors: Paul Butterworth, Alamo, CA (US); Evan Zhang, San Francisco, CA (US); Steve Langley, Walnut Creek, CA (US)

(73) Assignee: VANTIQ, INC., Walnut Creek, CA (US)

( * ) Notice: Subject to any disclaimer, the term of this patent is extended or adjusted under 35 U.S.C. 154(b) by 0 days.

(21) Appl. No.: 17/334,048

(22) Filed: May 28, 2021

(65) Prior Publication Data

US 2021/0294665 A1    Sep. 23, 2021

Related U.S. Application Data

(63) Continuation of application No. PCT/US2019/060999, filed on Nov. 12, 2019.
(Continued)

(51) Int. Cl.
*G06F 9/50* (2006.01)
*G06F 8/10* (2018.01)
(Continued)

(52) U.S. Cl.
CPC ............ *G06F 9/5066* (2013.01); *G06F 8/10* (2013.01); *G06F 8/433* (2013.01); *G06F 8/60* (2013.01); *G06F 8/75* (2013.01)

(58) Field of Classification Search
CPC ... G06F 8/10; G06F 8/433; G06F 8/75; G06F 9/5066
See application file for complete search history.

(56) References Cited

U.S. PATENT DOCUMENTS 5,325,526 A * 6/1994 Cameron ............... G06F 9/5066
711/173
5,457,797 A  10/1995 Butterworth et al.
(Continued)

FOREIGN PATENT DOCUMENTS

JP     2022510227 A    1/2022
WO  WO-2020112349 A1   6/2020

OTHER PUBLICATIONS

"International Application Serial No. PCT/US2019/060999, International Search Report dated Mar. 4, 2020", 4 pgs.
(Continued)

*Primary Examiner* — Jorge A Chu Joy-Davila
(74) *Attorney, Agent, or Firm* — Schwegman Lundberg & Woessner, P.A.

(57) ABSTRACT

A method to deploy a plurality of event-driven application components of an event-driven application in a distributed computing environment is described. The method includes automatically analyzing application source code of the event-driven application, using one or more processors, to identify relationships between the plurality of event-driven application components. Thereafter, a set of rules are applied to, based on the automatic analysis, generate assignment data recording assignments of event-driven application components to a plurality of computational nodes in the distributed computing environment. The set of rules is also applied to determine component requirements for each of the plurality of event-driven application components required to support execution at an assigned computational node in the distributed computing environment.

15 Claims, 14 Drawing Sheets

Related U.S. Application Data

(60) Provisional application No. 62/773,142, filed on Nov. 29, 2018.

(51) Int. Cl.
  G06F 8/41 (2018.01)
  G06F 8/75 (2018.01)
  G06F 8/60 (2018.01)

(56) References Cited

U.S. PATENT DOCUMENTS

| | | | | |
|---|---|---|---|---|
| 6,983,463 | B1* | 1/2006 | Hunt | G06F 9/5066 |
| | | | | 709/201 |
| 7,549,153 | B2 | 6/2009 | Butterworth et al. | |
| 9,804,945 | B1* | 10/2017 | Allen | G06F 8/00 |
| 10,601,871 | B2* | 3/2020 | Hosie | H04L 67/10 |
| 2004/0133656 | A1 | 7/2004 | Butterworth et al. | |
| 2004/0194017 | A1* | 9/2004 | Cosic | G06F 40/10 |
| | | | | 715/205 |
| 2006/0123401 | A1 | 6/2006 | Obrien et al. | |
| 2009/0119668 | A1* | 5/2009 | Foley | G06F 9/542 |
| | | | | 718/102 |
| 2013/0232480 | A1* | 9/2013 | Winterfeldt | G06F 8/60 |
| | | | | 717/177 |
| 2014/0068560 | A1 | 3/2014 | Eksten et al. | |
| 2017/0257432 | A1* | 9/2017 | Fu | H04L 67/2823 |
| 2019/0138287 | A1* | 5/2019 | De Capoa | G06F 9/44505 |
| 2019/0265971 | A1* | 8/2019 | Behzadi | G06Q 10/06 |
| 2019/0306024 | A1* | 10/2019 | Petria | H04L 67/34 |
| 2022/0091897 | A1 | 3/2022 | Butterworth et al. | |

OTHER PUBLICATIONS

"International Application Serial No. PCT/US2019/060999, Written Opinion dated Mar. 4, 2020", 8 pgs.

"European Application Serial No. 19836205.5, Response to Communication pursuant to Rules 161(1) and 162 EPC filed Jan. 17, 2022", 146 pgs.

"International Application Serial No. PCT/US2019/060999, International Preliminary Report on Patentability dated Jun. 10, 2021", 10 pgs.

* cited by examiner

DEPLOYMENT OF EVENT-DRIVEN APPLICATION IN AN IOT ENVIRONMENT

CROSS-REFERENCE TO RELATED APPLICATIONS

This application claims the benefit of priority to and is a continuation under 35 U.S.C. 111(a) of International Application No. PCT/US2019/060999, filed Nov. 12, 2019, and published as WO 2020/112349 A1 on Jun. 4, 2020, which claims the benefit of the filing date of U.S. Provisional Application Ser. No. 62/773,142, filed Nov. 29, 2018, the disclosures of each of which are incorporated by reference herein in their entireties.

BACKGROUND

Real-time, event-driven applications are taking center stage as the next generation of business applications, supporting the transition of businesses to become digital businesses. Next-generation planning, operations and customer engagement applications that provide optimal, personalized experiences depend on real-time sensing and near real-time decision making. Such applications must be built on a modern, event-driven application platform.

The term "application partitioning" refers to the process of developing applications that distribute the application logic among two or more computers in a network. In the simplest case, the application can run on a single PC, as a remote service, and send task requests for execution to a server. In more advanced cases, the application logic can be distributed among several servers.

Current application partitioning systems focus on portioning object-oriented applications distributed across a local area network. Such partitioning systems depend on users to identify specific object instances that are then manually placed on specific computational nodes. With the manual assignments in place, a partitioning system proceeds to allocate the remaining components to the partitions without consideration for the manual assignments and then binds the objects representing each node for access over the distributed communications system.

BRIEF SUMMARY

Example embodiments relate to a partitioning system that automatically allocates (or assigns) components of an event-driven computer application to computational nodes distributed throughout a computer network. Automatic allocation, which may include both analyses of component relationships and assignment of components, to reduce manual labor required to allocate the components of the application to the optimal computational node, reduce errors in assembling all required components for each node in the computer network and improve the efficiency of the partitioned application.

An example partitioning system includes a mechanism that expresses distributed computation in an intentional fashion. The partitioning system implements a set of source code analyzers that identify component relationships in the source code and apply a set of rules to the results of the analysis to determine both the optimal allocation of components to computational nodes and to determine the necessary and sufficient set of components required to support the execution of the components assigned to each computational node.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
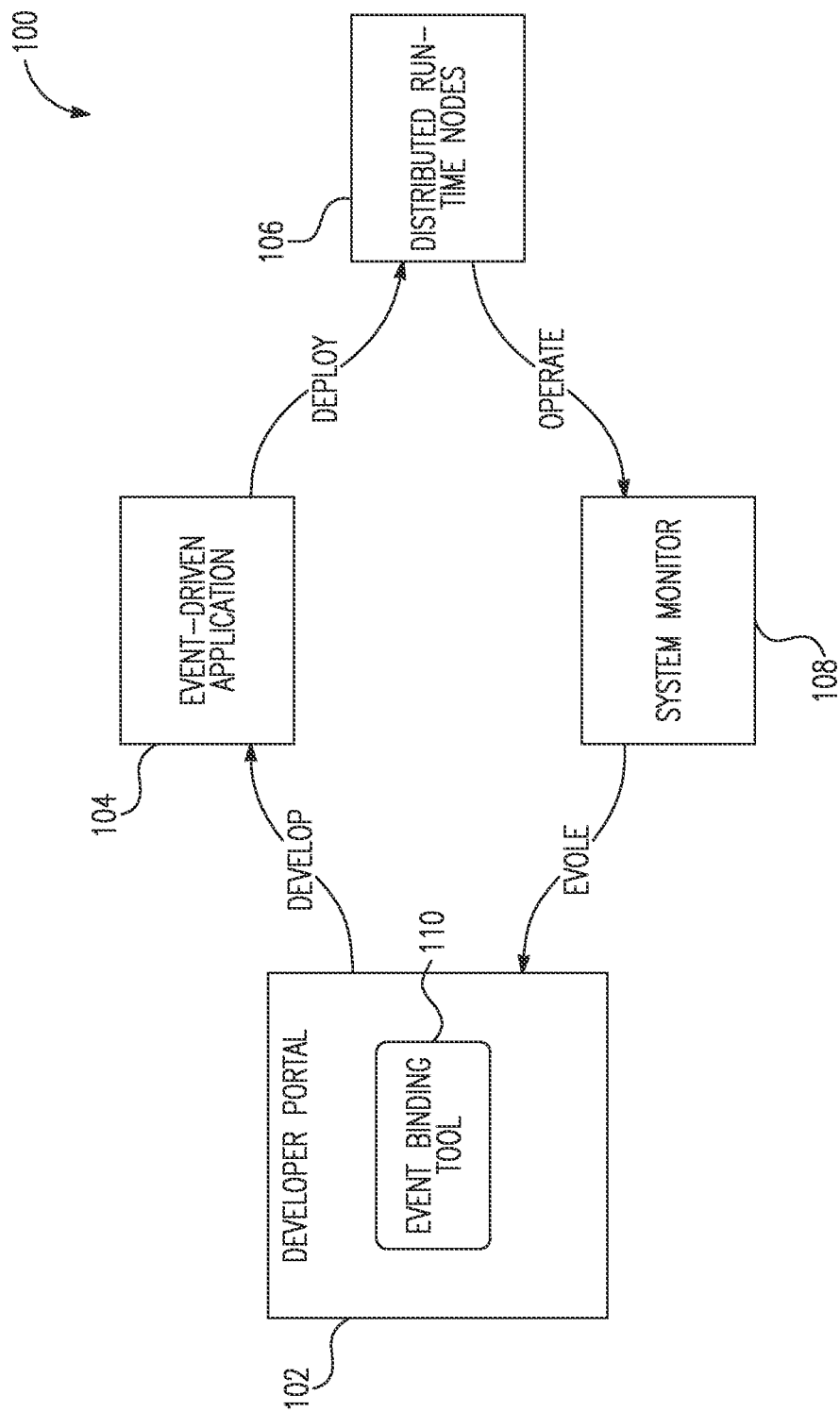
FIG. 1 illustrates a Platform-as-a-Service (PaaS), in accordance with one embodiment.

"Carrier Signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface.

"Communication Network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion/component) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-Readable Medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine-Storage Medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Signal Medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Mesh Network" refers to a network topology for a distributed computing environment in which the computational nodes connect, for example, directly, dynamically and non-hierarchically to as many other nodes as possible. The nodes may then cooperate to route network traffic from its source to its destination. Mesh networks may self-organize and self-configure dynamically. Mesh networks in which each node connects to all other peer nodes is known as a full mesh network. Mesh networks in which each node connects to a large but potentially selective set of peer nodes is known as a partial mesh.

Partitioning:

Technology and mechanisms, according to some example embodiments, to partition event-based applications are described herein. Specifically, a Platform-as-a-Service (PaaS) 100 is described, which includes a deployment manager that operates to identify node sets within a distributed computing environment, and then uses the identification of events, in event-based applications, to perform automated partitioning of such event-based applications. To this end, the deployment manager, and more specifically a partitioning system that forms part of the deployment manager, analyzes the source code of the event driven-application to infer relationships between components of the event-driven application. The partitioning system then applies a knowledge base of known relationships, via a rules system (e.g., assignment rules) to perform partitioning activity. The partitioning system then outputs configurations, reflecting the automated partitioning, as one or more configuration files.

The described embodiments provide a number of technical advantages over known solutions, in that the described embodiments do not require the a priori creation of object instances to drive the partitioning activity. Further, the described embodiments optimize the placement of components, whereas many current solutions operate to place all executable code on all computational nodes within a computing environment. Further, the described embodiments do not bind objects together because objects are simply not required, and bindings are dynamic as a function of the architectures of the event-based applications.

Event Broker:

According to some example embodiments, there is provided a mesh event broker, which distributes acquisition, augmentation and delivery of events across distributed nodes participating in one or more event ecosystems, such distributed nodes including event publishers, event subscribers and intermediaries. The mesh event broker, in some embodiments, seeks to eliminate a mediator as a single point of failure, distribute workload, to simplify and extend scaling, and to provide interconnection between event publishers and event subscribers within different networks.

According to some example embodiments, a collection of cooperating agents operates as a "mediator," and form a mesh network supporting direct point-to-point communication. Each cooperating agent is provisioned to support augmentation, and to provide delivery of a specific set of publishers and subscribers to events published by supported publishers. Similarly, subscribers may be provisioned to augment and deliver events for which they are local subscribers. In addition, the cooperating agents, as a mesh, can forward messages across the mesh to improve event transmission efficiency, and to bridge between agents that are configured on different networks.

Event-Driven Applications

According to some example embodiments, event-driven applications may be deployed in a distributed manner for improved responsiveness, robustness, and security. As described herein, an event-driven application may be developed in a single cloud location and then automatically partitioned, resulting in the components of the application being distributed to the most optimal nodes for execution whether the nodes are cloud hosted, data center hosted, intelligent devices at the edge, or a combination thereof. Logic is located where it is the most effective. A wide range of system topologies including star, hierarchical, and peer-to-peer are supported. The provisioning and management of these networks are made automatic and managed by intelligent features of the Platform-as-a-Service (PaaS) 100 described herein. Application components can be dynamically changed anywhere in a distributed environment for one or tens of thousands of nodes while the system is running.

Described example embodiments also seek to automate the design, provisioning, and management of real-time, event-driven applications so that the development of the systems can focus on the business logic and not necessarily the underlying infrastructure. To this end, the Platform-as-a-Service (PaaS) 100 provides capabilities and integrations that seek to improve the speed and efficiency with which event-driven business applications can be constructed, deployed and operated.

An event-driven application, according to some example embodiments, may incorporate the following flow:

Input is received from a number of sensors, for example over an extended period of time. Sensors may be, for example, physical sensors, data streams produced by other enterprise systems or public data streams.

The sensor data is analyzed to produce the events, consisting of information and context, on which automation, recommendation and collaboration decisions are made. Additional context may be extracted from other systems to augment the sensor data The events are evaluated in real time to determine the actions that need to be taken. For example, discrete rules and/or machine learning strategies may be used to perform the real-time evaluation.

Actions are transmitted to the responsible systems for implementation, or human-machine collaboration is initiated with responsible personnel to determine the most appropriate response to the current situation.

In real-time event-driven business applications, processing may be performed local to the device under control, improving response time and reliability. For example, in an industrial setting, managing the position of a materials handling system requires near real-time responses within a few hundred milliseconds. Such response times cannot be guaranteed by a remote decision-making system that may be delayed by thousands of milliseconds if there is a network problem. Processing is done in a secure environment that carefully manages access to situational data and the ability to initiate control actions.

At a high level, an event-driven application, as described herein, may operate to perform operations including data acquisition, situational analysis and response action responsive to a detected situation.

Dealing firstly with data acquisition or sensing, an event-driven application may receive data from any one of a number of sensors. Sensors may include, for example:

Mobile devices hosting sensor data including location, acceleration, audio, video and behavioral patterns derived from the raw sensor data.

Wearable devices such as watches, activity trackers, health monitors, audio and video headsets.

Machines including industrial machines, land and airborne transportation, home appliances and any mechanical or electronic equipment that can be sensed and/or controlled. For example, imagine a robot's manipulators instrumented with pressure sensors to vary the pressure applied to objects that may have different crush points.

Stand-alone sensors deployed in great numbers. For example, moisture sensors distributed across the fields of a farm to minimize water consumption while maximizing growth rates for the crops Video and audio feeds that produce high volumes of what can be considered sensor data. Recognition software is used to determine what the video represents to translate the video into more discrete events on which automation decisions can depend.

Existing enterprise applications producing streams of transactions.

Such sensors can be connected directly to the Internet with their own IP communications stack or may be indirectly connected to the Internet via an edge node. In the latter case, the sensors themselves may communicate over more specialized protocols such as Modbus or ZigBee with the edge node providing protocol conversion so that the sensors appear as virtual nodes participating in the IoT.

Turning now to situational analysis, once data has been acquired, a real-time, event-driven application may be responsible for analyzing the data, and producing events or situations that represent business or technical conditions that require a response. An event-driven application may then initiate an automatic response to the current state of the machine or customer, and/or a collaboration between the appropriate operations personnel and the system, to produce the optimal response.

Events and situations may be detected by analyzing the data streams and their context using rules, statistical methods, and machine learning. Examples of events or situations that may be detected during analysis include, merely for example:

Equipment that is not performing to expectations with conditions such as high temperature or low speed.

Customers that have arrived at an interesting location in a store or facility. For example, they are standing at a checkout kiosk or a specific merchandise display.

A user is in an unsafe area and needs help.

The distribution of orders has changed requiring the attention of product management.

Once a situation is detected, a response to the situation may be generated by an event-driven application. The response may be a response initiated autonomously by the automation system or a response determined via collaboration among the automation system and the responsible individuals. Responses may include:

Providing relevant responses to consumers based on their current situation (e.g., items on sale, facility map, emergency response recommendations).

Respond intelligently to exceptional conditions (e.g., close a valve, turn on sprinklers, stop a malfunctioning robot).

Proactively alert personnel to opportunities/problems based on the current situation (e.g., extra delivery trucks available, shortage in part of the supply chain).

Optimize the user or business resources to improve productivity and/or customer satisfaction (e.g., speed up an assembly line, advise sports attendees on the shortest path to their car).

In response to a situation, an automated response may be taken directly by the real-time, event-driven business application or may be forwarded to a more specialized system for implementation. For example, an action to shut down a machine may be forwarded to the control system that directly manages the machine rather than having the application directly send a shutdown command to it.

For situations where the optimal response may be somewhat ambiguous or where determining the optimal response is beyond the capabilities of the system, a collaboration activity involving the system and the responsible individuals develops the optimal response. For example, the sensor readings may indicate there is a potential problem with a machine but not provide enough information to automatically decide to shut it down. Instead, the operations team collaborates with the system to review the current data and obtain further information, for example via a visual inspection of the machine, to determine if the situation warrants a shutdown of the equipment.

Some cases in which collaboration can produce optimal outcomes:

Exception situations for which the data streams are inadequate to uniquely define the root cause and determine the best course of action.

Situations in which the operations team is privy to additional information not available to the system.

Situations in which a manual action must be taken on the part of a system that is not controllable online.

Situations in which policies or regulations demand more in-depth analysis of the situation before an action can be taken.

Another important class of collaborations notifies interested parties of actions taken and the resulting new state of the system. Notifications can be delivered to other automated systems so that they can independently respond to the situation, or delivered to responsible staff via desktop PCs, mobile devices, and wearable devices. Notifications can also include recommended actions and situational awareness of pending problems.

Real-time, event-driven business applications may be distributed. In manufacturing environments, for example, Programmable Logic Controllers (PLCs) communicate with area controllers and edge nodes that forward the data to more centralized IT systems. In consumer environments, data may be collected from numerous position sensors, processed locally into logical locations on which immediate automation decisions are made and forwarded to remote systems that optimize the experience for the consumer. Such a wide variety of distributed applications require support for an equally broad set of distributed topologies ranging from devices directly reporting to a central site, to hierarchically structured automation systems, to federated peers collaborating to improve a collection of organizations or businesses.

Simple architectures are sensors reporting to a central site. For example, a system collecting sensor data from a mobile phone and reporting that data to a cloud service represents an example of a centralized architecture.

More sophisticated architectures contain additional levels of processing and connectivity. Hierarchical systems are more complex and mimic many existing physical and organizational structures. For example, an industrial IoT system that consists of sensors reporting to local controllers that report to plant-wide controllers that report to divisional headquarters that report to corporate headquarters represents a tree topology. These systems provide both centralized and decentralized monitoring and control. Such systems are more responsive in real-time or near real-time situations. For example, it may be sub-optimal to control factory equipment in real time by collecting the data, transmitting the data to corporate HQ and having corporate HQ systems determine the next action for the machine. It may be more effective to do such an analysis on the local controller and simply report the situation and the action taken to the plant-wide controllers and, subsequently, to regional and corporate HQ. Faster response times, improved availability and local control make the distribution of the situational evaluation, collaborative decision making and response processing across the hierarchical topology more efficient than moving everything to HQ and making all decisions in a centralized fashion.

Another example of hierarchical real-time, event-driven business applications is the use of edge nodes to act as local processors for a collection of sensors and control points with the edge nodes then interacting with more centralized systems.

Examples of sophisticated distributed real-time, event-driven business applications are peer-to-peer systems, where peers are managed by separate organizations. For example, in an electrical demand-response system, the overall system consists of sensors managed by power utilities and sensors managed by utility customers while control of the system is distributed across the utility and its customers. To provide real-time demand-response, the utility system and the customer systems must collaborate. This is accomplished by each system making local decisions and transmitting both the local situation and the local decisions to the other party and then agreeing to modify their real-time behavior based on feedback from each other.

Platform-as-a-Service (Paas)

FIG. 1 is a block diagram illustrating the high-level functionality of a Platform-as-a-Service (PaaS) 100, within which example embodiments of the described technology may be deployed. The Platform-as-a-Service (PaaS) 100 is designed and architected to support development, deployment, and operation of real-time business applications. Specifically, the Platform-as-a-Service (PaaS) 100 includes a developer portal 102, using which developers develop event-driven application 104, which are then deployed to distributed run-time nodes 106. A system monitor 108 monitors operations of the event-driven application 104 on the distributed run-time nodes 106 and provides feedback to the developer portal 102 so as to enable a developer to evolve the event-driven application 104.

The event-driven application 104 may be event-driven (e.g., act instantly on an event rather than storing data and performing the latest status checks). The Platform-as-a-Service (PaaS) 100 may furthermore be implemented on a Reactive framework, so as to support the real-time functionality by providing an asynchronous and non-blocking platform. Event streams in a highly distributed and large-scale environment (e.g., when receiving events from an Internet-of-Things (IoT) environment) provide technical motivation for a move away from a traditional three-tier architecture, to an event-based model.

The Platform-as-a-Service (PaaS) 100 further supports the design and runtime of event-driven application 104 serving up large numbers of events. To this end, the Platform-as-a-Service (PaaS) 100 enables a topology of a massive number of distributed run-time nodes 106 in a distributed environment. The distributed run-time nodes 106 may be peered horizontally in order to provide additional processing power. Where the volume of data collected (or events generated) exceeds limits for upload to a central processor, or with low latency is required, the distributed run-time nodes 106 may be arranged in a tree-structure in order to migrate processing close to the data at the edge of the topology.

Further, the distributed run-time nodes 106 may be clustered horizontally to ensure mission-critical availability.

While the event-driven application 104 provides the benefits of an event-based architecture, and Reactive programming, the developer portal 102 may require only an understanding of JavaScript and SQL through the provision of "low-code" development tools. The development tools support the visual declaration of components where productive, as well as high-level scripting for more complex elements of the event-driven application 104 not suited for visual development. Specifically, the developer portal 102 may provide visual editors for rules, types, sources, collaborations, topics and configurations; scripting editors for rules and procedures; and a domain-specific language (DSL) based on SQL and JavaScript to leverage existing skills. In addition, the developer portal 102 provides testing capabilities through a rule and procedure debugger, tracing and logging facilities, real-time subscription support and data visualization, synthetic data generators, and incremental deployment. Further, the developer portal 102 supports deployment through a distributed configuration (e.g., cloud, private cloud, on-premise, hybrid, and edge), and a visual deployment tool (e.g. the event binding tool 110 which allows event binding as described below).

Event-Driven Application

Figure 2:
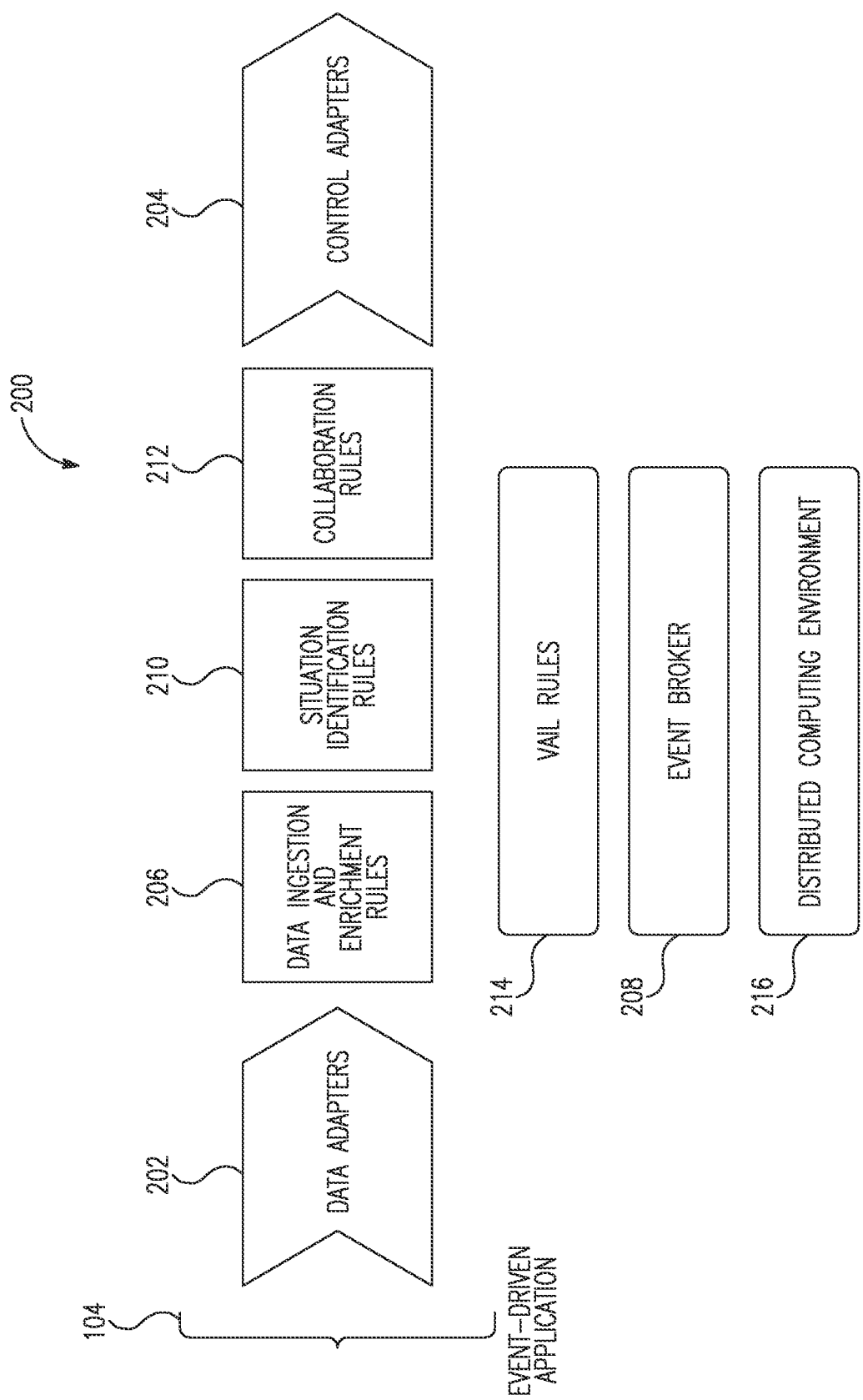
FIG. 2 illustrates an architecture, in accordance with one embodiment.

FIG. 2 is a block diagram, illustrating further details regarding an architecture 200 of an event-driven application 104 of the Platform-as-a-Service (PaaS) 100, according to some example embodiments.

The Platform-as-a-Service (PaaS) 100 provides a platform support developing, deploying and operating high performance, distributed real-time, event-driven business applications (e.g., the event-driven application 104) consisting of:

1. Data Acquisition: Technologies for obtaining data from IoT and enterprise sources, filtering the data and making it available to an automation decision engine.

2. Event and Situational Analysis: A decision engine for analyzing the data in real-time and making decisions based on the results.

3. Action: Technologies for sending control information to devices and for notifying external systems and users of the decisions or recommendations for subsequent actions being made by the automation solution. Technologies for managing collaboration between the automation system and the responsible individuals to develop optimal responses to complex situations.

To this end, FIG. 2 shows that the event-driven application 104 includes several adapters, including data adapters 202 and control adapters 204. The event-driven application 104 also includes a number of rules, specifically data ingestion and enrichment rules 206, situation identification rules 210. and collaboration rules 212.

The data ingestion and enrichment rules 206 are responsible for the ingesting and enrichment of data received by the data adapters 202. The data adapters 202 and the data ingestion and enrichment rules 206 form part of a data acquisition subsystem and enable integration with several enterprise systems, public data sources, social data sources (e.g., messaging systems, or any system with a REST interface). The data ingestion and enrichment rules 206 are responsible for the ingesting and enrichment of data received by the data adapters 202.

Broadly, the data acquisition subsystem acquires data from a wide array of data sources by using standard protocols such as, for example, REST, MQTT, and AMQP. The data sources may include, for example, IoT devices and enterprise systems that hold context required to evaluate the data flowing from sensors and placing of the sensor data in the proper context. For example, if an event-driven application is assisting a customer by tracking their location, access to information in a Customer Resource Management (CRM) system may be required to obtain the customer's profile information and to assess the opportunities to assist the user at their current location. This places a heavy emphasis on the integration of existing systems as part of the application. The Platform-as-a-Service (PaaS) 100 supplies a wide range of declarative integrations to facilitate the incorporation of existing enterprise systems into the real-time, event-driven business application.

The Platform-as-a-Service (PaaS) 100 may support:
Both push and pull models
Synchronous and asynchronous models
RPC (Remote Procedure Call), as well as store and forward messaging systems
The source may elect to send data by matching documented specified formats or can choose to have the Platform-as-a-Service (PaaS) 100 accept the native source format and use a filtering system to convert it to the proper format for internal processing.

With these capabilities, the data acquisition subsystem makes source integration simple by matching the interaction model and message protocols of the source, rather than requiring the source to match messaging models of the Platform-as-a-Service (PaaS) 100.

Further, the Platform-as-a-Service (PaaS) 100 supports a model for managing data hosted behind firewalls (e.g., a firewall 624 shown in FIG. 6) that do not allow external systems to communicate directly with the data sources.

Figure 6:
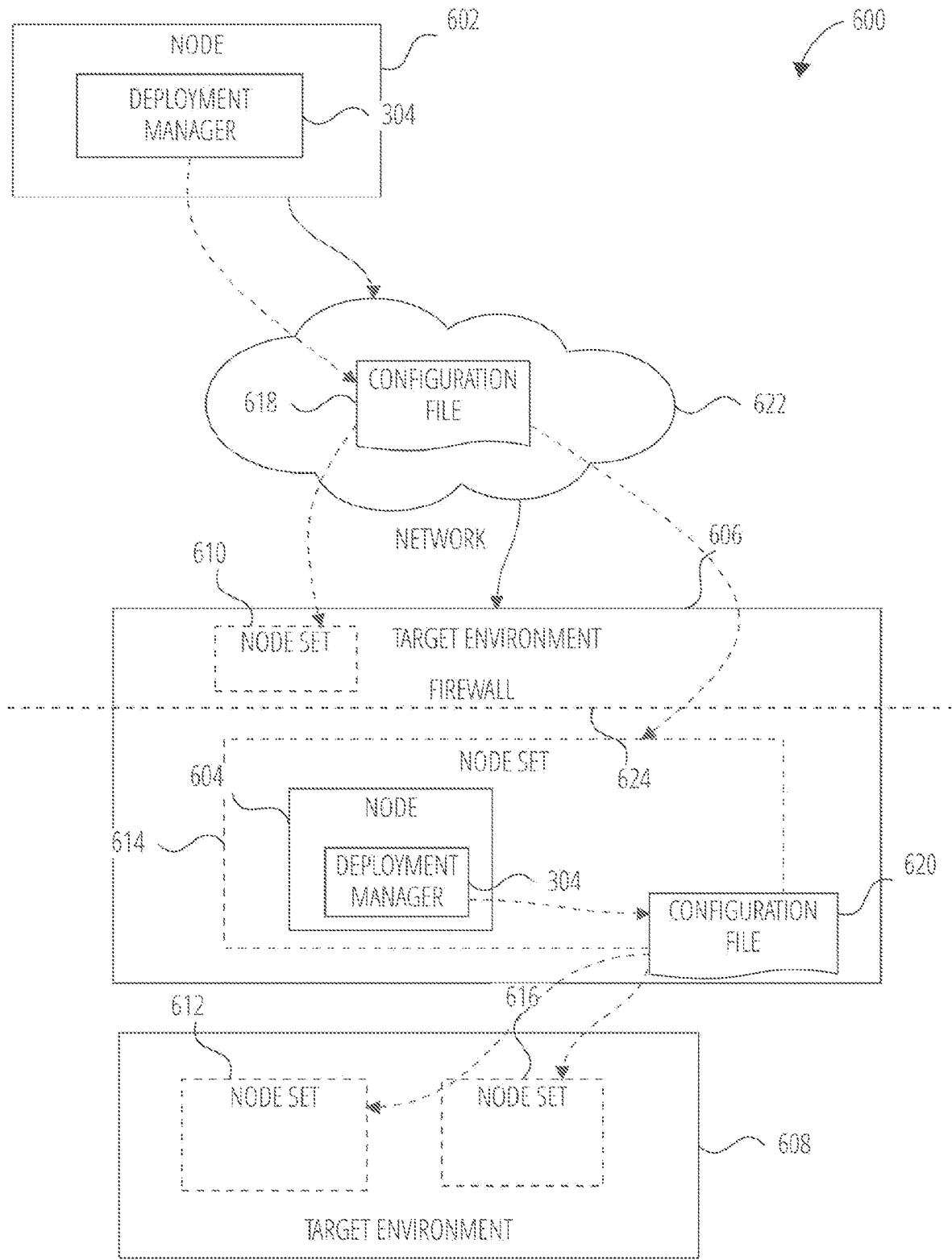
FIG. 6 illustrates a deployment environment, in accordance with one embodiment.

The flexible nature of the data acquisition subsystem allows such sources to provide data at their discretion rather than requiring the source to respond to an external request that cannot be delivered through a firewall (e.g., the firewall 624 of FIG. 6).

Security may be maintained by requiring the Platform-as-a-Service (PaaS) 100 to use user-supplied credentials to access data in peer nodes. Thus, every node has complete control in determining which peer nodes are authorized to access the local node.

Event and situational identification and analysis is performed by the situation identification rules 210. Specifically, the situation identification rules 210 may process streaming data in both simple and complex configurations:

Data from multiple streams can be correlated to assist in situational analysis. The developer uses a simple domain-specific language derived from SQL to specify that an event detected in one stream must come before or after an event in another stream, or both events must happen within a specific timeframe with the events occurring in either order. Even in cases where events do not occur, a common error indicator can be specified in a simple fashion. Event constraints can be composed to any level making the specification of complex conditions simple. For example, an automation system may monitor two sensor streams for a mechanical device with the first stream reporting speed and the second reporting position. If the automation system sends a stop request to the device, it expects to see the speed of the device as read by the first sensor go to zero and the position of the device to remain unchanged once a speed reading of zero has been seen. If the position changes AFTER a speed of zero has been reported an alert is generated. Also, if a position is NOT reported within 30 seconds of a speed of zero being reported an alert is generated indicating a potential failure of the device control system.

Some of the streaming data is processed immediately or held only for a short time to facilitate time-series construction while other data may represent an extended time series or historical data that must be maintained over longer periods of time. The 100 simplifies the use of both transient and persistent data by unifying the abstractions used to represent series and set data in both its transient and persistent form.

Data is analyzed by discrete collections of rules or by algorithms produced by machine learning systems and subsequently integrated into the application.

A complete set of services is available to forward data to other nodes in a distributed topology using the SQL-based domain-specific language to easily support real-time processing throughout the distributed environment.

Automation and collaboration are supported by the control adapters 204 and the collaboration rules 212.

The collaboration rules 212 are used to implement human-machine collaboration, between a human user and components of the Platform-as-a-Service (PaaS) 100. The collaboration rules 212 seek to enable human users and machines within the Platform-as-a-Service (PaaS) 100 to work as independently or collaboratively as possible, depending on the situation, and to adjust to each other's requirements (e.g., the human user drives operations, while the system reacts, or system drives operations, while the user reacts).

Actions may be applied directly to the internal state of a system. Actions may be applied to external devices using source integrations (e.g., the control adapters 204) that deliver the actions to external devices or edge nodes using standard integrations such as REST, MQTT, AMQP and others, or custom integrations.

The Platform-as-a-Service (PaaS) 100 provides a model for creating actions or responses that involve collaborations between the application and its users. The collaboration model supports development of collaborations by composing high-level collaboration patterns using a graphical editor of the developer portal 102. For example, the collaboration rules 212 may support a number of collaboration patterns including:

- Notification—handle notifications and responses via SMS, EMAIL, push notifications and messaging systems.
- Assignment—negotiate assignments of users to tasks.
- Location Tracking—significantly simplifies the task of knowing when a user reaches a specified destination, as well as their current location during their travels toward their destination.
- Conversation—mediate a conversation among users over third-party messaging systems.
- Escalation—respond to critical delays in completing tasks.

The Platform-as-a-Service (PaaS) 100 also supports mobile clients that can be used to easily integrate people into the overall collaborative decision-making process. The clients are designed to support natural and efficient interactions. Users are automatically notified of situations that need their attention, and custom interfaces for each notification supply the user with needed information. The user can respond by using data capture features of the mobile device—videos, photos, audio, location, acceleration, voice with natural language recognition, as well as traditional text entry.

While many systems force the distributed nature of an application to be explicitly programmed, configured and deployed, the Platform-as-a-Service (PaaS) 100 simplifies these operations by separating a logical definition of the application from its physical deployment. Using the developer portal 102, developers may define applications as if they are to run on a single system, while application components are automatically provisioned to nodes using vail rules 214. At runtime, the distributed run-time nodes 106 of the Platform-as-a-Service (PaaS) 100 operate together to act as a single real-time business application in a distributed computing environment 216, with events related to that application being processed by an event broker 208.

Topologies

The Platform-as-a-Service (PaaS) 100 supports a general model of distributed and federated topologies. A distributed application (e.g., event-driven application 104) may consist of two or more nodes, with each node representing an installation. An installation can contain a single service instance or a cluster of service instances. Installations are assembled into a distributed topology when an installation declares at least one "peer" node with which it desires to exchange messages.

Installations, by default, are considered independently managed. A node, A, declaring another node, B, as a peer must have credentials to access node B. Thus, the Platform-as-a-Service (PaaS) 100 is naturally federated since a node may only exchange messages with another node if it has been granted sufficient rights to perform the desired operation on the peer node. Peering is symmetric. If node B wishes to exchange messages with Node A, Node B must provision Node A as a peer and have sufficient rights to access node A.

Since the peering relationships can be defined between any two nodes, the Platform-as-a-Service (PaaS) 100 can support any distributed topology. Also, the topologies are implicitly federated since authentication and authorization are independently managed at each node.

Certain usage patterns may require (or favor) topologies in which all nodes in the distributed system are managed by a single authority. Such systems may be organized into star and tree topologies:

- Star—consists of a single parent node with an arbitrary number of child nodes.
- Tree—consists of a root node with an arbitrary number of child nodes where each child node may act as a parent for an arbitrary number of child nodes.

As the deployed system becomes more collaborative, more general federated peer-to-peer networks may be constructed. In such a network topology, any node may peer with any other node leading to a general graph structure representing the connections among the nodes. The network model tends to be the most complex since cycles in the graph are possible and the cycles must be handled by any functions that operate on more than one node in the graph.

Also, because each node represents an independent system that may require separate credentials, the Platform-as-a-Service (PaaS) 100 naturally generalizes to federations among collaborating organizations.

Deployment

Figure 3:
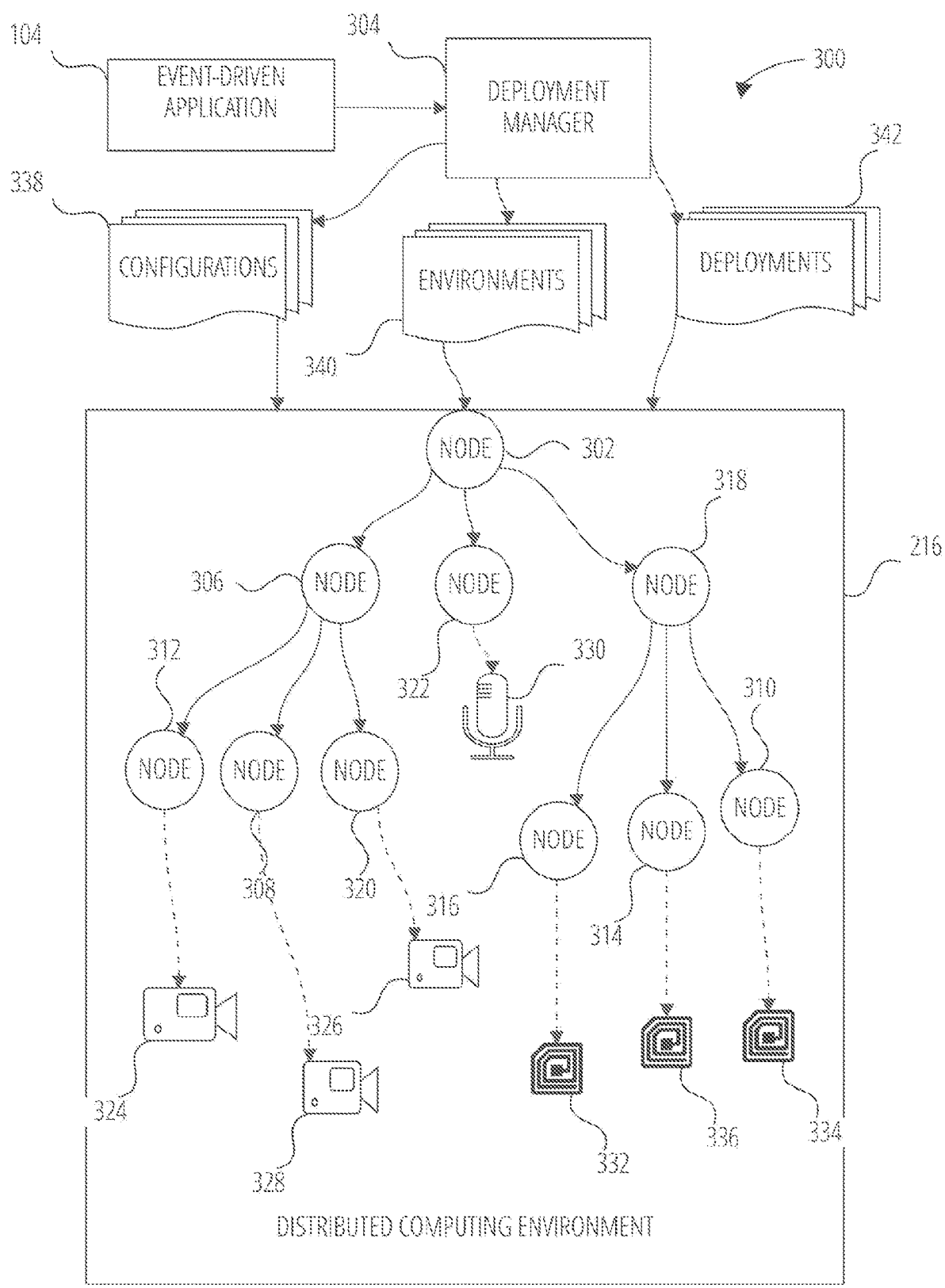
FIG. 3 illustrates a deployment, in accordance with one embodiment.

FIG. 3 is a diagrammatic representation showing a deployment 300, according to one example embodiment, of an event-driven application 104. Specifically, the Platform-as-a-Service (PaaS) 100 includes a deployment manager 304, which operationally manages of the deployment of an event-driven application 104 to a target environment, such as the distributed computing environment 216. FIG. 3 illustrates the distributed computing environment 216 as consisting of a number of nodes that are reachable, either directly or indirectly from a node on which the deployment manager 304 is running. The physical nodes in the distributed computing environment 216 may be organized into node sets, where a node is a member of a particular node set based on having descriptive properties that satisfy criteria established for the node set.

Each node within the distributed computing environment 216 may be a computational resource associated with a particular device or component. The network of nodes within the distributed computing environment 216 may thus be used to implement an Internet of Things (IoT), in which case of the event-driven application 104 may comprise an IoT application. For example, FIG. 3 shows that node 312, node 308 and node 320 (which may constitute a particular set of nodes or a partition) each associated with a respective camera 324, camera 328 and camera 326. Similarly, node 316, node 314 and node 310, which again may constitute a particular partition together with a node 318, are associated with a respective RFID tag 332, RFID tag 336, and RFID tag 334. Node 322 is likewise associated with a microphone 330.

The deployment manager 304 deploys configurations 338 of components (or artifacts) of an event-driven application 104 to specific nodes or node sets. A single configuration contains a manifest of components to deploy to a single node set. Each of the configurations 338 may define a corresponding partition, and a set of project artifacts (including components of an event-driven application 104) to be deployed to a specific partition. In one example, a partition logically represents a set of nodes onto which the project artifacts identified in a specific configuration will be deployed. A partition is defined by a constraint of a configuration on the attributes of the qualifying nodes, selected from the set of nodes within a target environment (e.g., the distributed computing environment 216.) Configurations 338 may be contained within one or more projects (as described below with reference to FIG. 4). A set of configurations 338 are defined within each respective project and define the set of partitions to which the artifacts of the project are to be deployed.

The deployment manager 304 is also used to define environments 340, with each environment consisting of a list of nodes contained within a particular environment (e.g., the node 302-node 322 within the distributed computing environment 216). When a project is deployed by the deployment manager 304 to an environment, each node in the environment is allocated to one or more partitions (e.g., a logical set of nodes). The project artifacts assigned to each partition are then deployed onto the nodes that are qualified members of the corresponding partition. It should also be noted that a set of nodes assigned to an environment (e.g., the distributed computing environment 216) may be a subset of the nodes defined within a namespace in which the deployment manager 304 is executing.

FIG. 3 also shows the deployment manager 304 as being associated with deployments 342. Each of the deployments 342 defines a binding between a project and an environment defined in that project. A deployment action takes a particular deployment of the deployments 342 as its argument and deploys the associated project into the environment.

Deployment parameters may be used to customize project artifacts for deployment in a particular environment. For example, each parameter may identify an artifact, and a property of that artifact. During deployment, the value associated with the parameter replaces the default value of that property in the definition of the relevant artifact.

Deployment Manager

Figure 4:
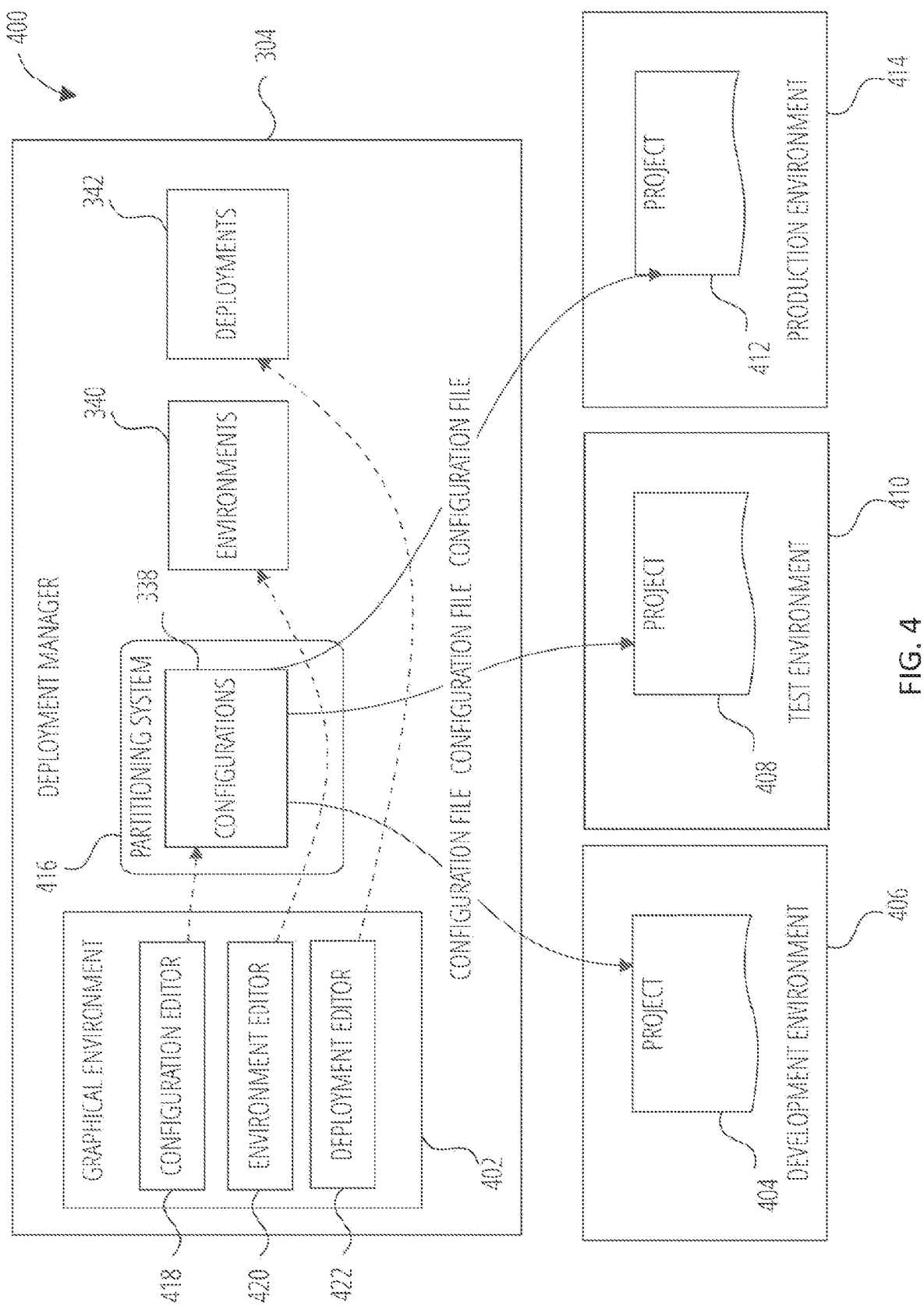
FIG. 4 illustrates a deployment environment, in accordance with one embodiment.

FIG. 4 is a block diagram showing further details of a deployment environment 400, according to some example embodiments. The deployment environment 400 includes a deployment manager 304, which operates to simplify development tasks for a developer, by focusing on the deployment of projects (e.g., project 404, project 408 and project 412).

The deployment manager 304 performs a number of functions, including:
  Automatically creating default partitions and the assignment of development artifacts to each partition.
  Automatically assigning of partitions to nodes defined in target environments 340.
  Enabling the user to customize configurations 338, environments 340 and deployments 342.
  Deploying projects and visualizing the status of the deployment activities.
  Via the CLI, making the deployment activities available to scripting and automation tools The deployment manager 304 presents a developer with a graphical environment 402, in which the developer can manage the configurations 338, environments 340 (e.g., a data structure that defines a target environment in which to manage configurations), environments 340 (e.g., a data structure that defines a target environment in which configurations 338 of a project are deployed), and deployments 342 (e.g., a data structure that defines a binding between configurations 338 and environments 340 of a project, as well as deployment activities). A particular project (e.g., project 404) may be deployed to more than one environment (e.g., development environment 406, test environment 410, and production environment 414), thus satisfying a need to deploy to multiple such environment types.

Further details are now provided regarding each of configurations 338, environments 340, and deployments 342.

Configurations

The configurations 338 contain the manifest of artifacts that are part of the configuration and the definition of the partition to which they are deployed. A configuration may define a single partition and the artifacts assigned to the partition. A project may contain one or more configurations with each configuration describing the artifacts deployed to a unique partition. An artifact may be a member of more than one configuration. A configuration may also contain other configurations in its manifest. In such cases, the child configuration may be deployed to the partition and then subsequently the child configuration is deployed using the deployment manager on the nodes assigned to the target partition.

Configurations 338 may contain only artifacts that are members of the containing project.

Artifacts that are included in configurations 338 and placed in partitions include:
  Rule
  Source
  Type
  Procedure
  Topic
  Visual rule
  Configuration
  Client
  RCS request
  RCS payload
  Collaboration type Applications and collaborations are included in configurations 338 but are not partitioned because they are comprised of more primitive, partitionable rules and procedures.

Environments

Each of the environments 340 enumerates a set of nodes that are members of the environment. The nodes may be members of the project in which the environment is defined. Environments 340 describe project independent computing topologies, making it possible to deploy multiple projects to a single environment. Nodes in an environment definition are not required to be assigned to a partition, further improving the reusability of environments 340 across multiple configurations and projects.

Deployments

A deployment identifies a binding between a development project and an environment, with the intention of deploying the project to the environment. The result of a deployment operation applied to a deployment is the artifacts in the project's configurations deployed onto the nodes defined in the environment.

Deployment parameters make projects and their configurations portable across environments. A deployment parameter identifies an artifact, a property of that artifact and a value assigned to the property. At deployment time, each deployment parameter value is substituted into the identified artifact property replacing the default value that was originally configured for the artifact. This allows the artifacts to be bound to physical resources that may be unique to each environment.

Projects

Turning specifically to projects (e.g., project 404, project 408, or project 412), each project contains a subset of artifacts that are defined within a namespace. As such, a project represents a deployable unit of functionality, which may informally be denoted as an application or a service. Regarding distinctions between applications and services, an application may operatively accept an inbound event stream, regardless of whether such an event stream is produced by an external system (e.g., an MQTT queue) or produced by a user via a user interface. Services, on the other hand, respond to invocation requests delivered via a REST interface, or by being invoked directly by a script. Services may be considered "micro-services," as they are independently deployed and transparently managed. As shown in FIG. 4, projects are also a unit of deployment, with the result of the deployment being an active application or service that executes in response to inbound requests.

Graphical Environment

As noted above, the deployment manager 304 presents developers with a graphical environment 402 (or visual editor) for visualizing and editing configurations 338 (using a configuration editor 418 component), environments 340 (using an environment editor 420 component), and deployments 342 (using a deployment editor 422 component).

The configuration editor 418 visually displays configurations 338/partitions in a drawing panel with a rectangular area representing each configuration/partition. A configuration can be thought of as the declaration of a partition, so the use of either "configuration" or "partition" is equally valid, depending on whether the emphasis is on the declaration or the resulting partition.

The artifacts that are assigned to each partition are placed within the partition to which they are assigned by a partitioning system 416 that forms part of the deployment manager 304. Within the configuration editor 418, artifacts are represented by the icons used to represent the artifacts in the project's resource graph, with each artifact icon placed in the area representing the partition to which the artifact is assigned. Since an artifact may be assigned to multiple partitions (or configurations 338), the artifact may be represented multiple times within the visualization.

A developer may edit partition definitions by adding and/or removing artifacts from a configuration by re-assigning them to a different partition. Additional partitions can be created, and artifacts assigned to them. Artifact assignments are subject to correctness constraints enforced by the partitioning system 416. The act of modifying configurations 338 invokes the partitioning system 416 to complete any reassignments required by the developer's actions.

The environment editor 420 visually displays the nodes that are members of an environment. The user may drill down to view the details of any node. Some environments 340 may contain a very large number of nodes. In such cases, all nodes are not necessarily enumerated on a diagram, but each class of nodes is represented by the constraints that define the members of the class of nodes.

These constraints are used by the developer to identify nodes that are defined in a namespace (e.g., an abstraction of a virtual environment) that should be members of a particular environment. An environment may have any number of constraints for identifying nodes. Nodes may also be assigned to the environment individually by the developer.

An environment may be edited by explicitly adding/removing nodes from the environment or by adding/removing/modifying a constraint that identifies a set of nodes to be included in the environment. If the developer is using constraints to specify membership, the environment editor 420 provides a mechanism for the developer to view the set of nodes identified by each constraint.

The nodes in the environment may be edited by drilling down into a node. Any changes to the properties of the node may cause the node to become a member of a different node class.

The deployment editor 422 visually displays the assignment of partitions to nodes or node classes based on the binding declared in the deployment. The deployment environment editor 420 is also capable of visualizing artifacts assigned to each partition and deployment parameters that modify the definition of each artifact within the deployment. A developer may edit the deployment parameters by selecting an artifact and changing the environment parameters bound to that artifact. If the artifact does not support environment parameters, the edit option will be disabled.

The developer may also view the status of the deployment on the visualization as each node visible on the diagram displays a status indicating whether the deployment is in progress, completed or has produced an error. The developer may drill down into indicated errors to diagnose the deployment problem.

Referring again specifically to FIG. 4, the deployment manager 304 may be used by a developer (or development team) to define a project for each target environment (which in turn comprises a collection of nodes). For example, the project 404 may be developed for the development environment 406, the project 408 may be developed for test environment 410, and the project 412 may be developed for the production environment 414. Thus, the deployment manager 304 facilitates the deployment of multiple instances of an event-driven application to separate environments, while addressing the following challenge: the application may be bound to different physical resources in each of the target environments (e.g., the development environment 406, the test environment 410, and the production environment 414). For example, the target nodes may all belong to common logical partitions, but production nodes may be physically distinct from test nodes. Similarly, sources are bound to different physical resources in different environments. FIG. 4 also shows that configurations 338, in the form of respective configuration files, are deployed to the respective projects from the partitioning system 416.

Figure 5:
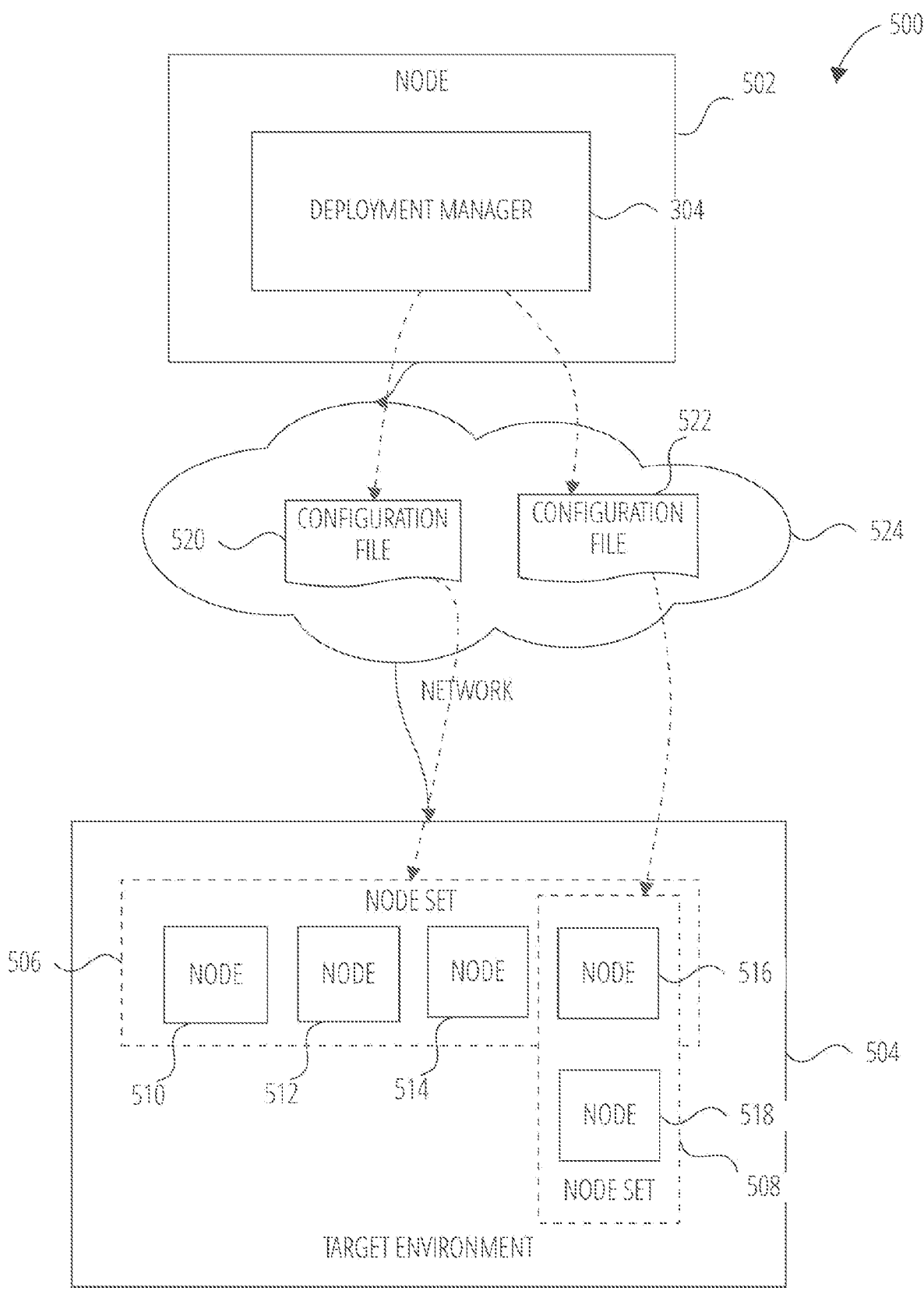
FIG. 5 illustrates a deployment environment, in accordance with one embodiment.

FIG. 5 and FIG. 6 illustrate respective scenarios for the deployment of configuration files to target environments. Referring specifically to FIG. 5, in a deployment environment 500, deployment manager 304, operating on a node 502, outputs two configuration files, namely configuration file 520 and configuration file 522, via a network 524 to a target environment 504. The configuration file 520 defines a first configuration (or partition) for a node set 506, which includes node 510-node 516. The configuration file 522 defines a second configuration (or partition) for a node set 508, which includes node 516 and node 518. It will accordingly be appreciated that a particular node may be shared between multiple node sets, such as node 516 which is shared by the node set 506 and of the node set 508.

Referring now to FIG. 6, a further deployment environment 600 is shown in which a particular parent configuration, represented by configuration file 618, contains other child configurations (e.g., represented by configuration file 620) in its manifest. FIG. 6 shows that the parent configuration file 618 is deployed from a first deployment manager 304, executing on a node 602, out to a target environment 606, via a network 622. The target environment 606 includes multiple node sets, including a node set 610 and a node set 614. The parent configuration file 618 is used to instantiate a further child deployment manager 304 on the node 604 of the node set 614. The child deployment manager 304 is then responsible for the deployment of the child configuration, represented by the child configuration file 620, to a further target environment 608, which includes further node sets, including node set 612 and node set 616.

Figure 7:
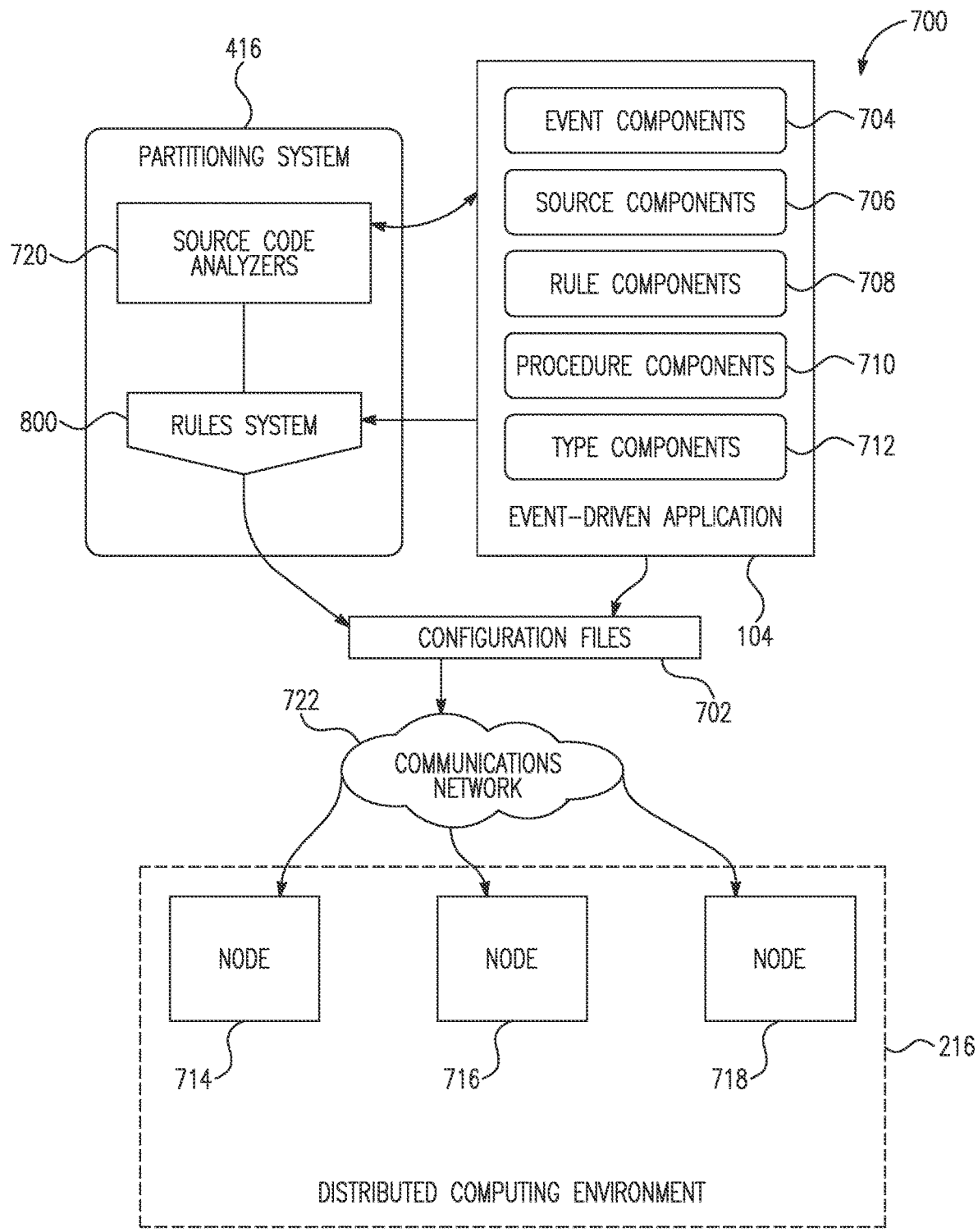
FIG. 7 illustrates a distributed computing environment, in accordance with one embodiment.

FIG. 7 is a diagrammatic representation showing further details regarding the partitioning system 416, according to some example embodiments. Specifically, the partitioning system 416 is shown to include several source code analyzers 720, which operationally analyze the source code of an event-driven application 104, to infer relationships between the components of the event-driven application 104, and further to discover remote references by such components. A remote reference identifies a set of nodes on which the processing occurs, and thus represents an abstract set of computing resources that satisfy the specified constraint. Further details regarding the source code analysis, as performed by the source code analyzers 720, are discussed with reference to FIG. 11.

Considering the event-driven application 104, such applications are executed in response to the reporting of an event within a distributed computing environment 216 in which the event-driven application 104 is deployed. Each such event may indicate the completion of an activity that is of interest to the event-driven application 104. Events arrive at a particular event-driven application 104 from a variety of sources over a communications network 722 and may range, for example, from the reading of a value from a sensor within the distributed computing environment 216, to the identification of a new strategic initiative by a user operator of the event-driven application 104.

FIG. 7 shows that an event-driven application 104 may include a number of specialized components, with primary component classes including:
event components 704;
source components 706;
rule components 708;
procedure components 710; and
type components 712.

An event-driven application 104 may run within the distributed computing environment 216 such that each of the components of the event-driven application 104 is located on one or more computational nodes (e.g., node 714, node 716, or node 718) within the distributed computing environment 216.

The distributed computing environment 216 is shown in FIG. 7 to include a set of computational nodes in the form of node 714-node 718, with each node representing computing resources that can execute code, store data and communicate with other computational nodes over the communications network 722. The computational nodes may be hosted in public clouds, private clouds, data centers or edge environments. Furthermore, a computational node has a unique address, using which other computational nodes may communicate with the relevant computational node. An event-driven application 104 executes in the distributed computing environment 216 by allocating components of the event-driven application 104 to one or more available computational nodes, such that execution proceeds through the collaborative actions of the participating computational nodes within the distributed computing environment 216.

Figure 8:
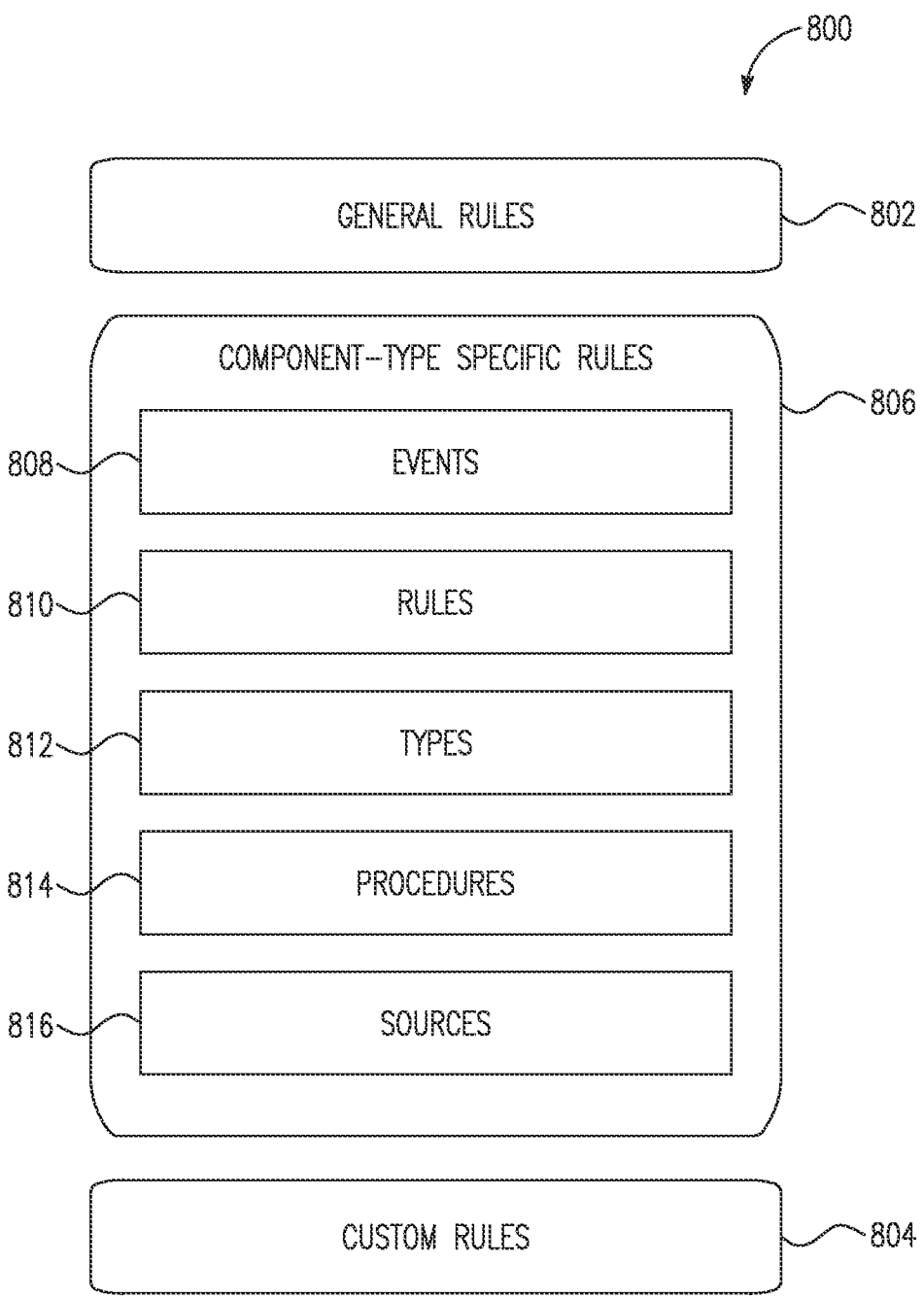
FIG. 8 illustrates an operation, in accordance with one embodiment.

FIG. 8 is a diagrammatic representation of the rules system 800, shown in FIG. 7, which operatively outputs configurations, in the form of configuration files 702, according to which various components of the event-driven application 104 are deployed to computational nodes within the distributed computing environment 216. Specifically, the rules system 800 includes rule sets that are applied to analyze the source code of the event-driven application 104, and to determine node set assignments. The identification of node sets, as well as the assignment of components of an event-driven application 104 to these node sets, are described in further detail below with reference to FIG. 11 and FIG. 12.

As shown in FIG. 8, the rules system 800 includes a number of rule sets to define abstract sets of computational resources, known as node sets, to which application components are assigned. The rules system 800, and the relevant rule sets, apply assignment rules to the analyzed code to determine node set assignments. The rules system 800 also includes a schema for extending assignment rules to accommodate the specialized needs of specific event-based applications.

The rules system 800 includes three broad categories of rules, namely general rules 802, component-type specific rules 806, and custom rules 804. The rules system 800 applies these three categories of rules to assign components of an event-driven application 104 to node sets. This is done by recursively applying the general rules 802, which are broadly applicable to all component types, followed by the applying of the component-type specific rules 806, which are applicable to single component types, and then followed by the applying of the custom rules 804.

The component-type specific rules 806 are applicable to events 808, rules 810, types 812, procedures 814, and sources 816. Further details regarding the application of these rules are discussed below, with reference to FIG. 9.

Figure 9:
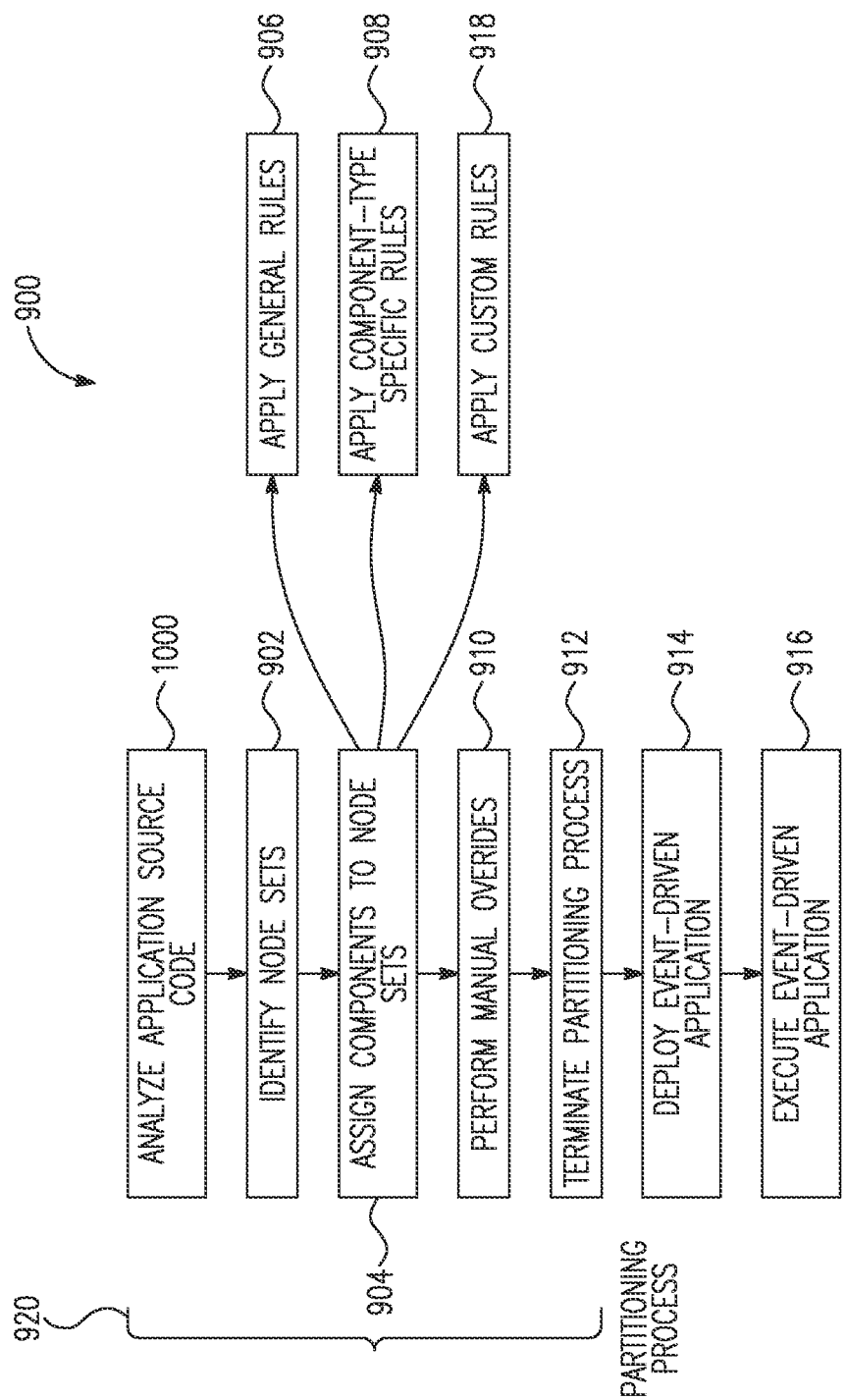
FIG. 9 illustrates a method, in accordance with one embodiment.

FIG. 9 is a flowchart illustrating a method 900, according to some example embodiments, to partition, deploy and execute an event-driven application 104 within a distributed computing environment 216.

In contrast to method 900, certain methods and tools for the construction of a distributed, event-based application may require the manual assignment of components to computational nodes, via explicit programmer actions. Such assignment activity is labor-intensive, error-prone and, in many cases, results in a suboptimal allocation of application components to computational nodes. Certain efforts to automate such assignments have focused on identifying objects, which are then manually assigned to a specific computational node as the basis for distributed communication among the nodes, but with limited focus on the optimal allocation of additional components to each node.

The method 900, in some example embodiments, may be deployed to precisely determine minimal code that can be assigned to each computational node of a distributed computing environment 216. To this end, the method 900 may exploit a programming notation for specifying classes of computational nodes, on which a programming directive should be executed.

At a high-level, the method 900 includes a partitioning process 916 to automatically allocate components of an event-driven application 104 to node sets (and, by inference to computational nodes assigned to each node set), followed by a deployment process for the event-driven application 104 (operation 910), and an execution process for the event-driven application 104 (operation 912). The partitioning process 916 exploits a programming notation to specify a class of computational nodes on which a programming directive should be executed.

Programming Notation

The partitioning process 916, as performed by the partitioning system 416, is, in some example embodiments, based on the notion that components of an event-driven application 104 are allocated to nodes in a distributed computing environment 216 to ensure the correctness of the event-driven application 104, and to optimize performance and availability of the event-driven application 104. However, the assignment to specific nodes during an application development process is challenging, for the reason that developers may have only an abstract view of the ultimate topology of a target distributed computing environment 216 during application development. To address this technical challenge, the partitioning process 916 and partitioning system 416 define, in some example embodiments, an abstract model of a distributed computing technology by identifying node sets that represent one or more nodes that will exhibit properties associated with the particular node set. Consider the example where a developer knows that there will be computational resources (e.g., computational nodes) associated with refrigeration units in an IoT application, but a number of such nodes, their locations and identities remain unknown until late in the deployment process (operation 910), and until well after the allocation of components of the event-driven application 104 to computing resources is complete. The partitioning system 416 and partitioning process 916, according to some example embodiments, abstract these assignments by supporting a declarative model, in which the developer specifies references to components by specifying a logical constraint that the computing resource must meet. The logical constraint is subsequently formalized as a node-set, which may contain one or more nodes in a final deployment topology. Returning to the example of the refrigeration units, the computing resources associated with the refrigeration units may be specified, for example, by the processing constraint as follows:

PROCESSED BY ManagedEquipment=="refrigeration"

Application Analysis

Referring specifically to the partitioning process 916, at operation 1000, the source code analyzers 720 analyze the event-driven application 104, in preparation for node set of discovery and component assignment activities.

Figure 10:
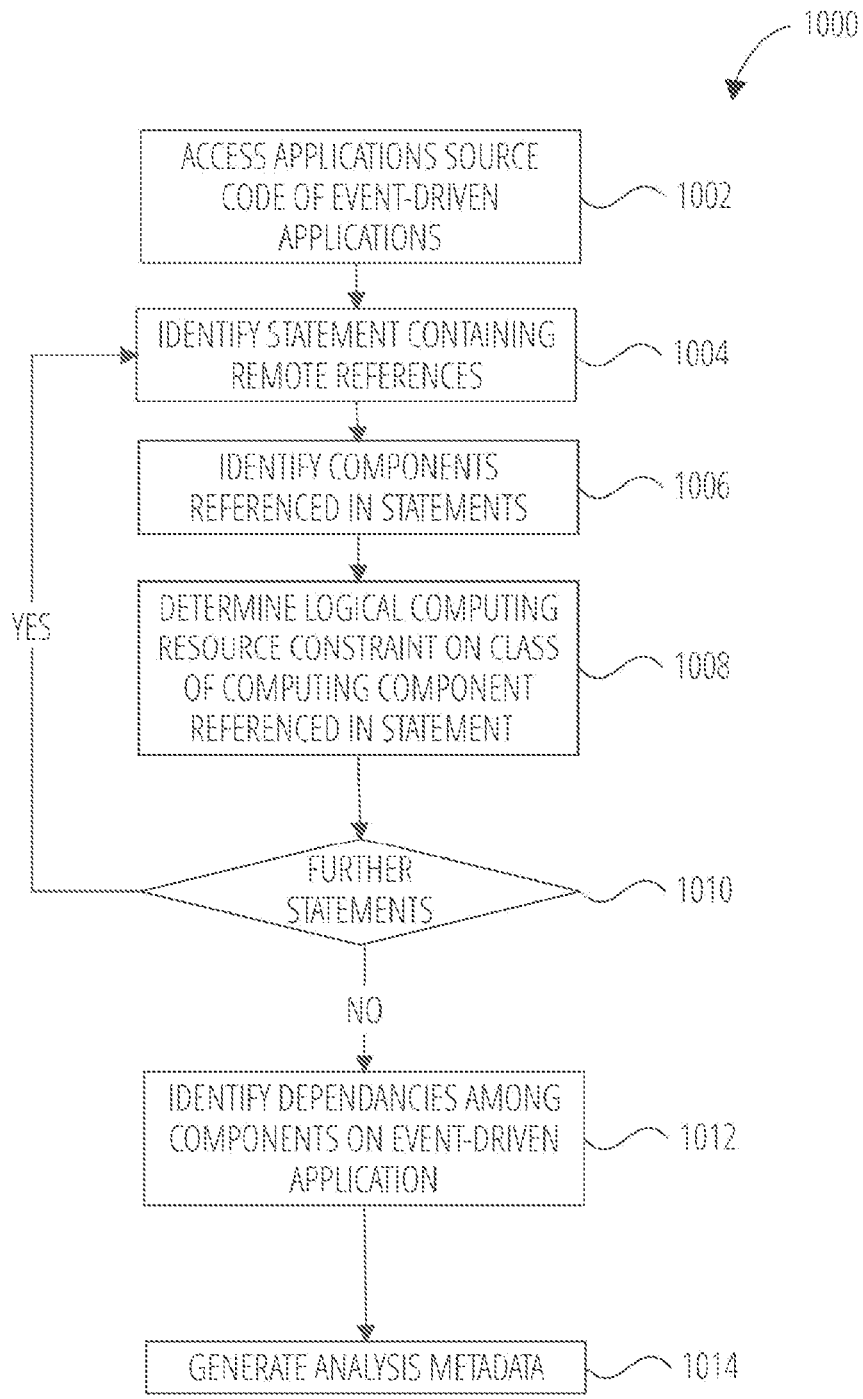
FIG. 10 illustrates an operation, in accordance with one embodiment.

FIG. 10 is a flowchart illustrating further sub-operations or the operation 1000, performed by the source code analyzers 720, to analyze application source code. Specifically, operation 1000 commences with operation 1002, where the source code analyzers 720 access the source code of a particular event-driven application 104.

At operation 1004, the source code analyzers 720, identify statements, within the application source code, containing remote references, whereafter, at operation 1006, the source code analyzers 720 identify components being referenced in such statements.

At operation 1008, the source code analyzers 720 determine logical computing resource constraints on the class of computing resources needed to host the referenced component.

For example, the statement: EXECUTE PROCEDURE checkRefrigerationSettings ("temperature") PROCESSED BY ManagedEquipment=="refrigeration" will cause the procedure checkRefrigerationSettings to be partitioned to the node set that represents "ManagedEquipment". Another example might be the statement: SELECT * FROM Person WHERE age>21 PROCESSED BY department=="HR" will cause the type "Person" to be partitioned to all nodes in a node set that supports HR locations. This implies the data will be distributed across all "HR" nodes. Subsequently, a query such as: SELECT * FROM Person PROCESSED BY department=="HR" will run a distributed query against all Person types in all nodes in the node-set that supports HR locations to construct the complete result set.

At decision operation 1010, the source code analyzers 720 determine whether there are further statements, within the application source code, containing remote references. If so, the operation 1000 loops back to operation 1004. On the other hand, should it be determined at decision operation 1010 that no further statements containing remote references to process, the operation 1000 progresses to operation 1012, wherein the source code analyzers 720 operate to identify dependencies among components of the event-driven application.

For example, a rule, R, that references a procedure, P, and the reference is not a remote reference causes the procedure P to be partitioned into the same node-sets as rule R, so that the dependency of R on P can be satisfied by a local reference within the node-set. In turn, procedure P might reference type, T, in a statement that does not include a remote reference. This causes the type T to be partitioned into the same node-sets as R and P.

At operation 1014, the source code analyzers 720 then generates analysis metadata, which is used to drive further operations of the partitioning process 916.

Identifying Node Sets (Operation 1100)

Returning to FIG. 9, at operation 1100, the source code analyzers 720 of the partitioning system 416 proceeds to identify node sets.

Figure 11:
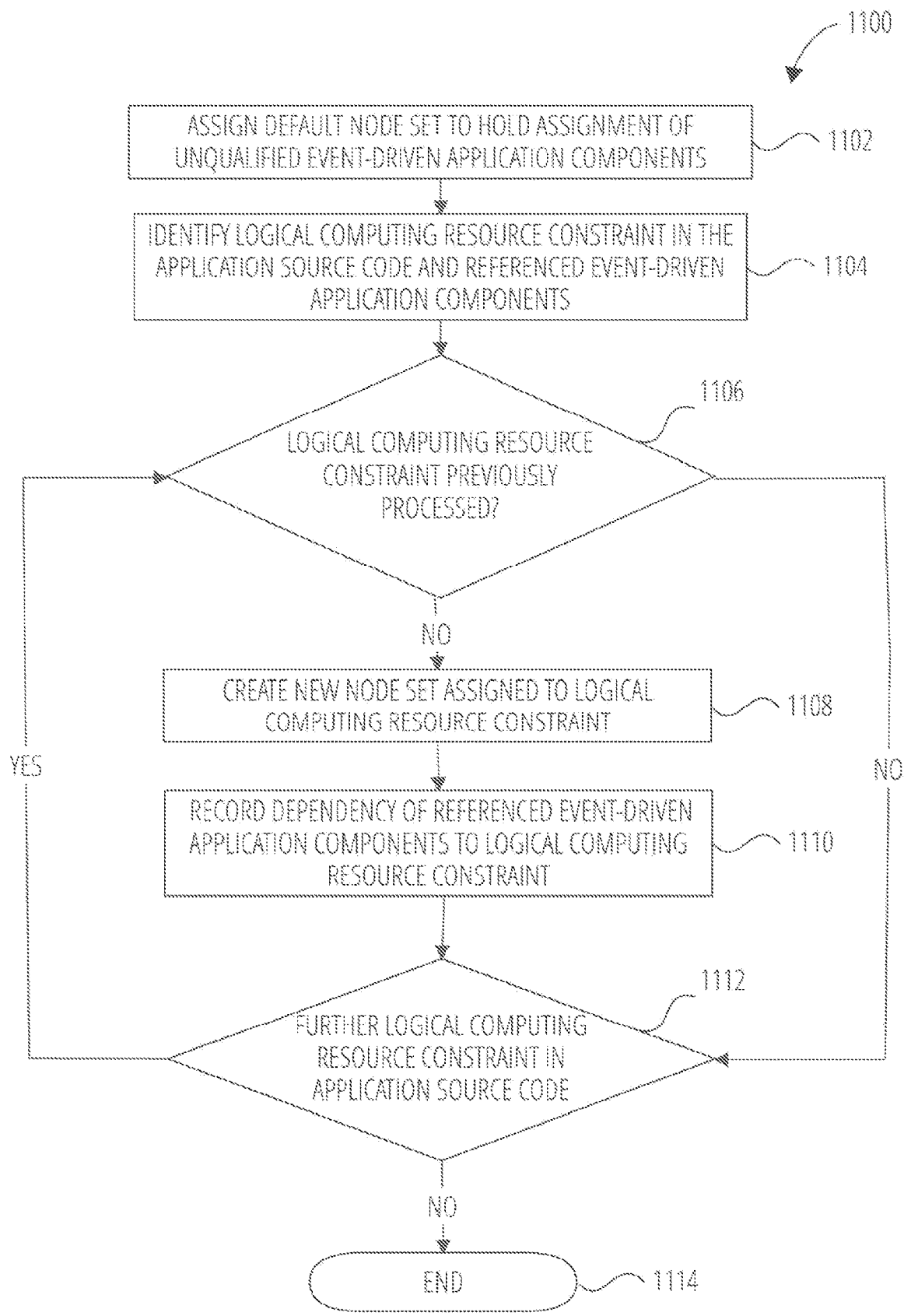
FIG. 11 illustrates an operation, in accordance with one embodiment.

FIG. 11 is a flowchart illustrating further sub steps of the operation 1100, as may be performed by the source code analyzers 720. The operation 1100 commences at operation 1102, with the assignment of a default node set to hold assignments for all unqualified components of the event-driven application.

At operation 1104, the source code analyzers 720 identify and inspect each logical computing resource in the application source code, and perform two determinations at decision operation 1106 and decision operation 1112.

Specifically, at decision operation 1106, for a specific logical computing resource, a determination is made as to whether that specific logical computing resource constraint has been previously processed by the source code analyzers 720. Following a negative determination at decision operation 1106, at operation 1108, the source code analyzers 720 created a new node set, which is then assigned to the specific logical computing resource constraint.

At operation 1110, the source code analyzers 720 record a dependency of the referenced event-driven application components to a logical computing resource constraint. In other words, once a new logical constraint (that will map to a node set) has been identified, the source code analyzers 720 operate to record the list of event-driven application components that are referenced via that logical constraint (as these event-driven application components will be partitioned onto the corresponding node set). At decision operation 1112, the source code analyzers 720 assess whether there are any further logical computing resource constraints, in the application source code, that require analysis. If so, the operation 1100 loops back to decision operation 1106. On the other hand, if not, the operation 1100 terminates at done operation 1114.

Assigning Components to Node Sets (Operation 902)

Returning to FIG. 9, at operation 902, the rules system 800 assigns components of the event-driven application to node sets identified at operation 1100. Specifically, the rules system 800 performs the assignment of these components by recursively applying a set of general rules 802 applicable to all component types at operation 1200, followed by applying a set of more specialized rules applicable to only a single component type, namely component-type specific rules 806, at operation 904. Finally, a set of custom rules 804 is applied by the rules system 800 at operation 914. These custom rules 804 may be for specific classes of applications and applied to more optimally assigned components to node sets for such specific classes of applications. For example, a programmer may wish to assign all power management components of an event-driven application to node sets that manage equipment that has high power consumption (e.g., refrigeration units). The custom rules 804 support incorporation of such additional partitioning semantics.

Figure 12:
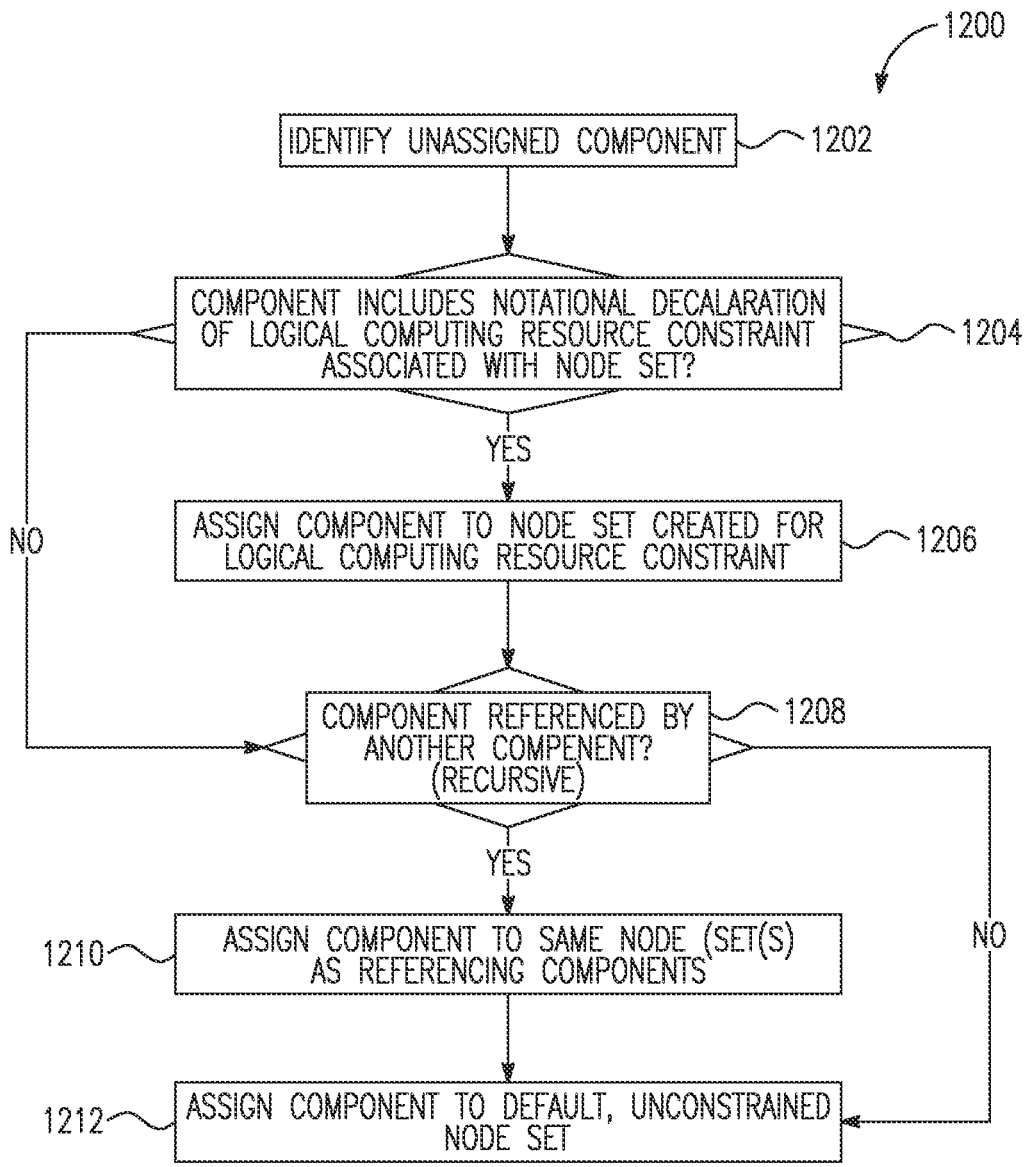
FIG. 12 illustrates an operation, in accordance with one embodiment.

FIG. 12 is a flowchart illustrating further substeps of the operation 1200, namely the application of the set of general rules 802 which are applicable to all component types, to assign components of the event-driven application to node sets.

Operation 1200 commences at operation 1202, with the identification of an unassigned component, following which a determination is made, by the rules system 800 at decision operation 1204, regarding whether the identified component includes a notational declaration (e.g., a"PROCESSED BY<resource>" clause) of a logical computing resource constraint associated with a specific node set (e.g., a node set created by the relevant logical computing resource constraint).

Following a positive determination at decision operation 1204, the rules system 800 proceeds to assign the relevant component to the node set created for that logical computing resource constraint at operation 1206. Upon completion of operation 1206, or following a negative determination at decision operation 1204, the operation 1200 progresses to decision operation 1208. At decision operation 1208, a determination is made as to whether the component (without a notational declaration of a logical computing resource) is referenced by other components that do include such notational declarations. If so, the relevant component is assigned to the same node set as the referencing component at operation 1210. Operation 1210 is performed recursively until all artifacts have been inspected. Accordingly, a component may be assigned all configurations that contain a reference to that component.

A component that remains unassigned following a negative determination at decision operation 1208 is then, at operation 1212, assigned to a default, unconstrained node set. For each component assigned to this default, unconstrained node set, a recursive traversal of all artifacts that it references is further performed at operation 1212, and any artifact referenced without a notational declaration (e.g., a "PROCESSED BY" clause) is also partitioned onto the default node set.

Returning to the application of the component-type specific rules 806 at operation 904, each of these rule types is considered separately below.

Events 808 An event is partitioned to the node set on which it is produced. More specifically, events may be produced by types, rules, procedures, sources and external requests.

If no resource notational declaration (e.g., a "PROCESSED BY" clause) is specified in a process (e.g., publish) request, the event is partitioned by the rules system 800 onto the same node set as the artifact that produces the event. On the other hand, if a resource declaration (e.g., a "PROCESSED BY" clause) is specified in a process (e.g., publish) request, the event is partitioned onto the node set specified by the resource declaration.

A process (e.g., publish) request initiated as an external request is partitioned to the default node set since no information as to the destination of the request is known to the rules system 800. Similarly, user-defined events are partitioned to the default node set if no other information about the event is known. Other information might be a reference to the event in a process request (e.g., a PUBLISH statement). Such a reference causes the full set of event partitioning rules described above to be evaluated against the event. The converse is also true; if an event is partitioned onto a node set, the component that produces the event is also partitioned to the same node set.

Rules 810: rules 810 are partitioned to the same node set on which the triggering event is produced. The converse is also true; if a rule is partitioned onto a node set, the event that triggers the rule is also partitioned to the same node set and, by implication, the artifact producing the event is partitioned to the same node set.

Types 812: types 812 referenced by a component are placed on the same node set as the artifact. A type may be referenced by components on different node sets and is provisioned on all node sets that contain a component that references the type. If a component references a type using a resource declaration (e.g., a "PROCESSED BY" clause), the type is provisioned onto the node set defined by the resource declaration (e.g., a "PROCESSED BY" clause).

If a component references a type without a resource declaration, the type is partitioned onto the same node set as the referencing component.

Procedures 814: procedures 814 are partitioned to all node sets that contain a component that references the procedure. It should be noted that there may be no information available on procedures invoked via an external interface. Procedures that have no known references and that are, therefore, likely to be invoked via the external interface, are partitioned to the default node set.

A procedure that is referenced by a component and is invoked via the external interface may be partitioned manually to the node set that services external requests.

Sources 816: sources 816 are partitioned to the default node set by default. If the event produced by a source triggers a rule that has been explicitly partitioned, the source is placed in the same node set as the triggered rule. Sources 816 may be partitioned manually by a developer that knows the best place to obtain the data. This manual placement then drives automatic partitioning using the manual placement as fixed.

Having completed the assignment of components to node sets at operation 902, the method 900 progresses to operation 906, where manual overrides may be performed. Specifically, once the rules described above have been applied recursively to all components of an event-driven application, partitioning by the partitioning system 416 is complete and the event-driven application is ready for deployment. At this point, programmers or deployment managers may view a visualization of the partitioned application, this visualization displaying each of the components and the node sets to which the components have been assigned. A programmer then manually modifies the partition definitions, for example using a drag and drop interface. When a component is manually allocated to a node set, the partitioning rules described above may be evaluated to assure that the partitioning satisfies the constraints embodied in the rules system 800 Any changes to the allocation of components to node sets required to satisfy the constraints of the rules system 800 are then automatically performed by the rules system 800.

Having then completed operation 906, the method 900 progresses to terminate the partitioning processes at operation 912. Thereafter, the event-driven application is ready for deployment at operation 914, and subsequent execution at 916.

Figure 13:
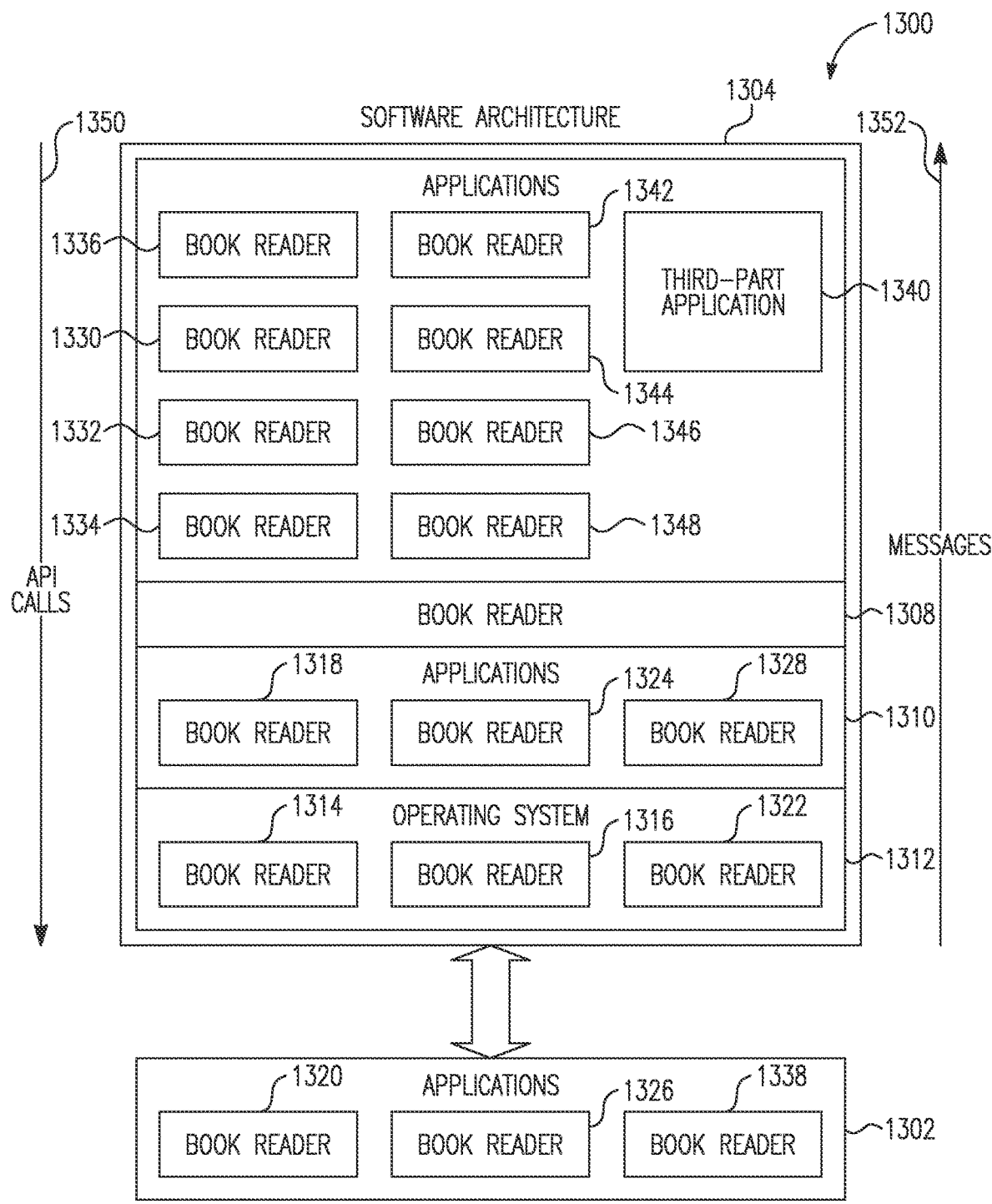
FIG. 13 is a block diagram showing a software architecture within which the present disclosure may be implemented, in accordance with some example embodiments.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1310 provide a low-level common infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a high-level common infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example embodiment, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The applications 1306 are programs that execute functions defined in the programs. Various programming languages can be employed to create one or more of the applications 1306, structured in a variety of manners, such as object-oriented programming languages (e.g., Objective-C, Java, or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

Figure 14:
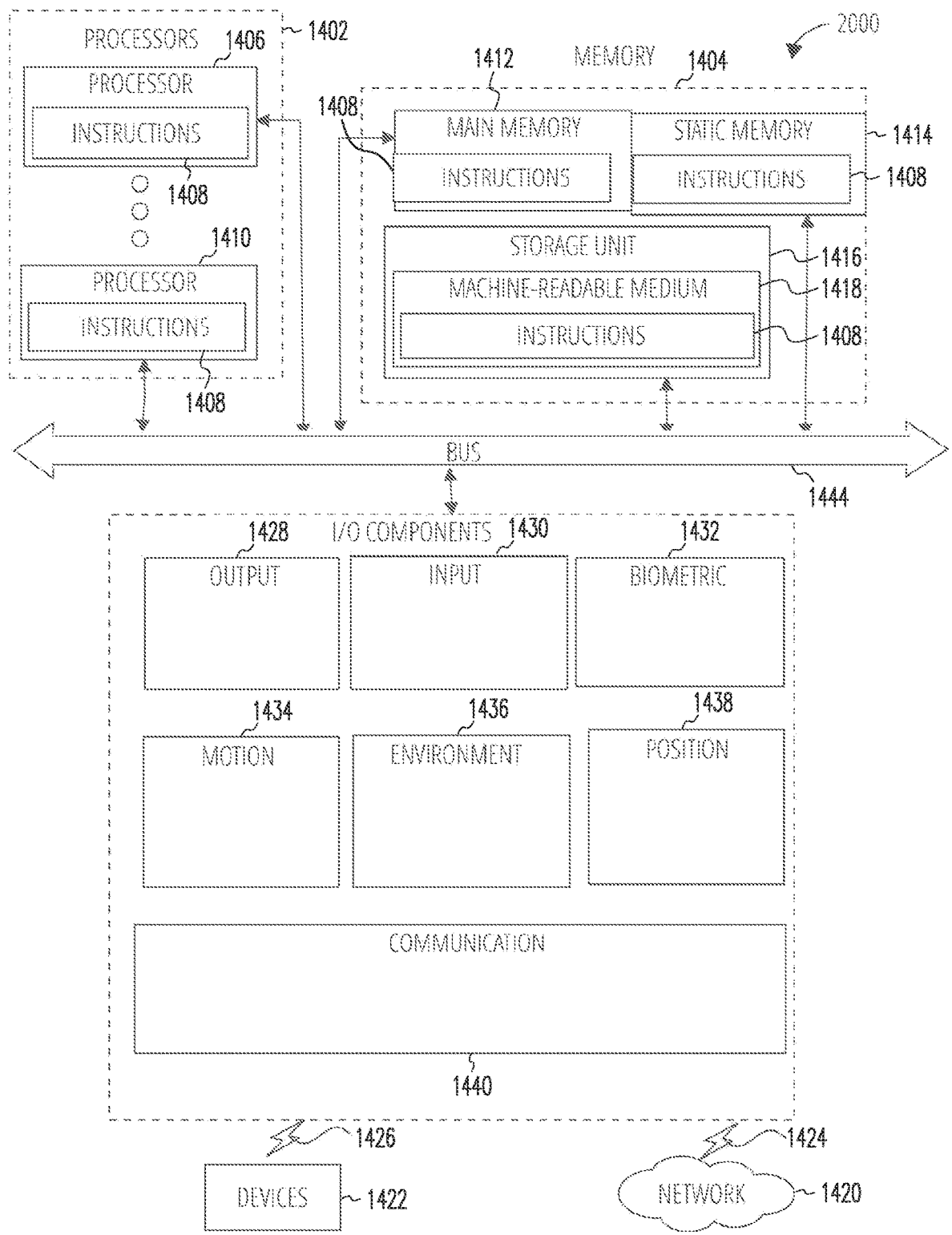
FIG. 14 is a diagrammatic representation of a machine in the form of a computer system within which a set of instructions may be executed for causing the machine to perform any one or more of the methodologies discussed herein, in accordance with some example embodiments.

FIG. 14 is a diagrammatic representation of the machine 1400 within which instructions 1408 (e.g., software, a program, an application, an applet, an app, or other executable code) for causing the machine 1400 to perform any one or more of the methodologies discussed herein may be executed. For example, the instructions 1408 may cause the machine 1400 to execute any one or more of the methods described herein. The instructions 1408 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1408, sequentially or otherwise, that specify actions to be taken by the machine 1400. Further, while only a single machine 1400 is illustrated, the term "machine" shall also be taken to include a collection of machines that individually or jointly execute the instructions 1408 to perform any one or more of the methodologies discussed herein.

The machine 1400 may include processors 1402, memory 1404, and I/O components 1442, which may be configured to communicate with each other via a bus 1444. In an example embodiment, the processors 1402 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1406 and a processor 1410 that execute the instructions 1408. The term "processor" is intended to include multi-core processors that may comprise two or more independent processors (sometimes referred to as "cores") that may execute instructions contemporaneously. Although FIG. 14 shows multiple processors 1402, the machine 1400 may include a single processor with a single core, a single processor with multiple cores (e.g., a multi-core processor), multiple processors with a single core, multiple processors with a single core, multiple processors with multiples cores, or any combination thereof.

The memory 1404 includes a main memory 1412, a static memory 1414, and a storage unit 1416, both accessible to the processors 1402 via the bus 1444. The main memory 1404, the static memory 1414, and storage unit 1416 store the instructions 1408 embodying any one or more of the methodologies or functions described herein. The instructions 1408 may also reside, completely or partially, within the main memory 1412, within the static memory 1414, within machine-readable medium 1418 within the storage unit 1416, within at least one of the processors 1402 (e.g., within the processor's cache memory), or any suitable combination thereof, during execution thereof by the machine 1400.

The I/O components 1442 may include a wide variety of components to receive input, provide output, produce output, transmit information, exchange information, capture measurements, and so on. The specific I/O components 1442 that are included in a particular machine will depend on the type of machine. For example, portable machines such as mobile phones may include a touch input device or other such input mechanisms, while a headless server machine will likely not include such a touch input device. It will be appreciated that the I/O components 1442 may include many other components that are not shown in FIG. 14. In various example embodiments, the I/O components 1442 may include output components 1428 and input components 1430. The output components 1428 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1430 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1442 may include biometric components 1432, motion components 1434, environmental components 1436, or position components 1438, among a wide array of other components. For example, the biometric components 1432 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 include acceleration sensor components (e.g., accelerometer), gravitation sensor components, rotation sensor components (e.g., gyroscope), and so forth. The environmental components 1436 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1438 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1442 further include communication components 1440 operable to couple the machine 1400 to a network 1420 or devices 1422 via a coupling 1424 and a coupling 1426, respectively. For example, the communication components 1440 may include a network interface component or another suitable device to interface with the network 1420. In further examples, the communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1422 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geolocation, location via Wi-Fi® signal triangulation, location via detecting an NFC beacon signal that may indicate a particular location, and so forth.

The various memories (e.g., memory 1404, main memory 1412, static memory 1414, and/or memory of the processors 1402) and/or storage unit 1416 may store one or more sets of instructions and data structures (e.g., software) embodying or used by any one or more of the methodologies or functions described herein. These instructions (e.g., the instructions 1408), when executed by processors 1402, cause various operations to implement the disclosed embodiments.

The instructions 1408 may be transmitted or received over the network 1420, using a transmission medium, via a network interface device (e.g., a network interface component included in the communication components 1440) and using any one of a number of well-known transfer protocols (e.g., hypertext transfer protocol (HTTP)). Similarly, the instructions 1408 may be transmitted or received using a transmission medium via the coupling 1426 (e.g., a peer-to-peer coupling) to the devices 1422.

Statements

1. A method to deploy a plurality of event-driven application components of an event-driven application in a distributed computing environment, the method comprising:

automatically analyzing application source code of the event-driven application, using one or more processors, to identify relationships between the plurality of event-driven application components; and applying, using the one or more processors, a set of rules to:
based on the automatic analysis, generate assignment data recording assignments of event-driven application components to a plurality of computational nodes in the distributed computing environment; and
determine component requirements for each of the plurality of event-driven application components required to support execution at an assigned computational node in the distributed computing environment.

2. The method according to any one or more of the preceding claims, including assigning each of the plurality of computational nodes to a respective node set of a plurality of node sets.

3. The method according to any one or more of the preceding claims, wherein the generating of the assignment data comprises assigning a common set of event-application components to each node of a respective node set of the plurality of node sets.

4. The method according to any one or more of the preceding claims, wherein the set of rules is applied to assign each of the plurality of event-driven application components to an optimal node set of the plurality of node sets that is sufficient to provide proper operation of the event-driven application.

5. The method according to any one or more of the preceding claims, wherein the optimal node set to which a respective event-driven application component is assigned is identified based on a determination of minimal code that may be assigned to the respective event-driven application component.

6. The method according to any one or more of the preceding claims, wherein the automatic analysis of the application source code includes identifying a notational declaration of a remote reference by each of the event-driven application components of the plurality of event-driven application components.

7. The method according to any one or more of the preceding claims wherein the notational declaration of the remote reference comprises a declaration of a logical computing resource constraint of the remote reference.

8. The method according to any one or more of the preceding claims, wherein the analyzing of the application source code includes analyzing the notational declaration to identify a class of computational nodes on which a programming directive, specified by a specific event-driven application component, is to be executed.

9. The method according to any one or more of the preceding claim 1, wherein the analyzing of the application source code includes determining a resource that operationally triggers execution of a specific event-driven application component.

10. The method according to any one or more of the preceding claims, wherein the analyzing of application source codes includes determining a resource referenced by a specific event-driven application component 11. The method according to any one or more of the preceding claims, wherein analyzing the application source code includes identifying a dependency of an identified code segment of a specific event-driven application component.

12. The method according to any one or more of the preceding claims wherein the automatic analysis of the application source code includes generating analysis metadata that is used to generate the assignment data.

13. A computing apparatus, the computing apparatus comprising:
a processor; and
a memory storing instructions that, when executed by the processor, configure the apparatus to:
automatically analyze application source code of an event-driven application, using one or more processors, to identify relationships between a plurality of event-driven application components; and
apply, using the one or more processors, a set of rules to:
based on the automatic analysis, generate assignment data recording assignments of event-driven application components to a plurality of computational nodes in a distributed computing environment; and
determine component requirements for each of the plurality of event-driven application components required to support execution at an assigned computational node in the distributed computing environment.

14. The computing apparatus according to any one or more of the preceding claims including assigning each of the plurality of computational nodes to a respective node set of a plurality of node sets.

15. The computing apparatus according to any one or more of the preceding claims, wherein the generating of the assignment data comprises assigning a common set of event-application components to each node of a respective node set of the plurality of node sets.

16. The computing apparatus according to any one or more of the preceding claims, wherein the set of rules is applied to assign each of the plurality of event-driven application components to an optimal node set of the plurality of node sets that is sufficient to provide proper operation of the event-driven application.

17. The computing apparatus according to any one or more of the preceding claims, wherein the optimal node set to which a respective event-driven application component is assigned is identified based on a determination of minimal code that may be assigned to the respective event-driven application component.

18. The computing apparatus according to any one or more of the preceding claims, wherein the automatic analysis of the application source code includes identifying a notational declaration of a remote reference by each of the event-driven application components of the plurality of event-driven application components.

19. The computing apparatus according to any one or more of the preceding claims, wherein the notational declaration of the remote reference comprises a declaration of a logical computing resource constraint of the remote reference.

20. The computing apparatus according to any one or more of the preceding claims, wherein the analyzing of the application source code includes analyzing the notational declaration to identify a class of computational nodes on which a programming directive, specified by a specific event-driven application component, is to be executed.

21. The computing apparatus according to any one or more of the preceding claims, wherein the analyzing of the application source code includes determining a resource that operationally triggers execution of a specific event-driven application component.

22. The computing apparatus according to any one or more of the preceding claims wherein the analyzing of application source codes includes determining a resource referenced by a specific event-driven application component 23. The computing apparatus according to any one or more of the preceding claims, wherein analyzing the application source code includes identifying a dependency of an identified code segment of a specific event-driven application component.

24. The computing apparatus according to any one or more of the preceding claims, wherein the automatic analysis of the application source code includes generating analysis metadata that is used to generate the assignment data.

25. A non-transitory computer-readable storage medium, the computer-readable storage medium including instructions that when executed by a computer, cause the computer to:
automatically analyze application source code of an event-driven application, using one or more processors, to identify relationships between a plurality of event-driven application components; and
apply, using the one or more processors, a set of rules to:
based on the automatic analysis, generate assignment data recording assignments of event-driven application components to a plurality of computational nodes in a distributed computing environment; and
determine component requirements for each of the plurality of event-driven application components required to support execution at an assigned computational node in the distributed computing environment.

What is claimed is:

1. A method to deploy a plurality of event-driven application components of an event-driven application in a distributed Internet of Things (IoT) computing environment, the event-driven application configured to receive event data from a plurality of sensors within the distributed Internet of Things (IoT) computing environment, process the event data to identify an event, and identify a response to the event, the method comprising:
automatically analyzing application source code of the event-driven application, using one or more processors, the automatic analyzing comprising:
identifying relationships between the plurality of event-driven application components,
determining component requirements of the plurality of event-driven application components to be supported at an assigned computational node,
identifying an abstract node set of a plurality of node sets for assignment to the plurality of event driven application components, and
generating a configuration file assigning the plurality of event-driven application components to the abstract node set based on the component requirements of the plurality of event-driven application components;
assigning an actual node set of the distributed Internet of Things (IoT) computing environment to the abstract node set; and
using the configuration file and the one or more processors, automatically deploying the plurality of event-driven application components to the actual node set of the distributed Internet of Things (IoT) computing environment, the actual node set having been assigned to the abstract node set,
wherein the identifying of the abstract node set comprises identifying a notational declaration of a remote reference by each of the event-driven application components of the plurality of event-driven application components, each remote reference representing an abstract set of computing resources that satisfy a logical computing resource constraint and the notational declaration of the remote reference comprising a declaration of the logical computing resource constraint of the remote reference.

2. The method of claim 1, wherein the generating of the configuration file assignment data comprises assigning a common set of event-application components to each node of a respective abstract node set of the plurality of node sets.

3. The method of claim 1, wherein the abstract node set to which a respective event-driven application component is assigned is identified based on a determination of minimal code that may be assigned to the respective event-driven application component.

4. The method of claim 1, wherein the analyzing of the application source code includes analyzing the notational declaration to identify a class of computational nodes on which a programming directive, specified by a specific event-driven application component, is to be executed.

5. The method of claim 1, wherein the analyzing of the application source code includes determining a resource that operationally triggers execution of a specific event-driven application component.

6. The method of claim 1, wherein the analyzing of the application source code includes determining a resource referenced by a specific event-driven application component.

7. The method of claim 1, wherein the analyzing of the application source code includes identifying a dependency of an identified code segment of a specific event-driven application component.

8. The method of claim 1, wherein the analyzing of the application source code includes generating analysis metadata that is used to generate the configuration file.

9. The method of claim 1, wherein the plurality of node sets comprises a default node set, and each event-driven application component is assigned to the default node set prior to the automatic analyzing.

10. A computing apparatus, the computing apparatus comprising:
at least one processor; and
a memory storing instructions that, when executed by the at least one processor, configure the apparatus to:
automatically analyze application source code of an event-driven application in a distributed Internet of Things (IoT) computing environment, the event-driven application configured to receive event data from a plurality of sensors within the distributed Internet of Things (IoT) computing environment, process the event data to identify an event, and identify a response to the event, the automatic analyzing comprising:
identifying relationships between a plurality of event-driven application components of the event-driven application,
determining a component requirement for execution of each of the plurality of event-driven application components to be supported at an assigned computational node,
identifying an abstract node set of a plurality of node sets for assignment to a plurality of event driven application components, and
generating a configuration file assigning an event-driven application component of the plurality of event-driven application components to the abstract node set based on the component requirements of the event-driven application components;

assigning an actual node set of the distributed Internet of Things (IoT) computing environment to one or more abstract node sets; and using the configuration file, automatically deploying the event-driven application components to the actual node set of the distributed Internet of Things (IoT) computing environment, the actual node set having been assigned to the abstract node set, wherein the identifying of the abstract node set comprises identifying a notational declaration of a remote reference b each of the event-driven application components of the plurality of event-driven application components, each remote reference representing an abstract set of computing resources that satisfy a logical computing resource constraint and the notational declaration of the remote reference comprising a declaration of the logical computing resource constraint of the remote reference.

11. The computing apparatus of claim 10, wherein the generating of the configuration file comprises assigning a common set of event-application components to each node of a respective abstract node set of the plurality of node sets.

12. The computing apparatus of claim 10, wherein the analyzing of the application source code includes determining a resource that operationally triggers execution of a specific event-driven application component.

13. The computing apparatus of claim 10, wherein the analyzing of application source codes includes determining a resource referenced by a specific event-driven application component.

14. The computing apparatus of claim 10, wherein the plurality of node sets comprises a default node set, and each event-driven application component is assigned to the default node set prior to the automatic analyzing.

15. A non-transitory computer storage medium, the computer-storage medium including instructions that when executed by at least one computer, cause the at least one computer to perform operations comprising:

automatically analyzing application source code of an event-driven application in a distributed Internet of Things (IoT) computing environment, the event-driven application configured to receive event data from a plurality of sensors within the distributed Internet of Things (IoT) computing environment, process the event data to identify an event, and identify a response to the event, the automatic analyzing comprising:

identifying relationships between a plurality of event-driven application components of the event-driven application, determining a component requirement for execution of each of the plurality of event-driven application components to be supported at an assigned computational node, identifying an abstract node set of a plurality of node sets for assignment to a plurality of event driven application components, and generating a configuration file assigning an event-driven application component of the plurality of event-driven application components to the abstract node set based on the component requirements of the event-driven application components;

assigning an actual node set of the distributed Internet of Things (IoT) computing environment to one or more abstract node sets; and using the configuration file, automatically deploying the event-driven application components to the computational nodes of the actual node set of the distributed internet of Things (IoT) computing environment, the actual node set having been assigned to the abstract node set, wherein the identifying of the abstract node set comprises identifying a notational declaration of a remote reference by each of the event-driven application components of the plurality of event-driven application components, each remote reference representing an abstract set of computing resources that satisfy a logical computing resource constraint and the notational declaration of the remote reference comprising a declaration of the logical computing resource constraint of the remote reference.

* * * * *

UNITED STATES PATENT AND TRADEMARK OFFICE
CERTIFICATE OF CORRECTION

PATENT NO. : 11,397,620 B2
APPLICATION NO. : 17/334048
DATED : July 26, 2022
INVENTOR(S) : Butterworth et al.

It is certified that error appears in the above-identified patent and that said Letters Patent is hereby corrected as shown below:

In the Claims

In Column 33, Line 11, in Claim 10, delete "b" and insert --by-- therefor

In Column 34, Line 28, in Claim 15, delete "internet" and insert --Internet-- therefor Signed and Sealed this
First Day of November, 2022

*Katherine Kelly Vidal*

Katherine Kelly Vidal
*Director of the United States Patent and Trademark Office*